(12) United States Patent
Penn

(10) Patent No.: US 11,805,907 B2
(45) Date of Patent: *Nov. 7, 2023

(54) SPRING ACTUATED ROCKING MECHANISM FOR COLLAPSIBLE CHAIR

(71) Applicant: Denovo Brands, LLC, Bentonville, AR (US)

(72) Inventor: Richard Justin Penn, Centerton, AR (US)

(73) Assignee: Denovo Brands, LLC, Bentonville, AR (US)

( * ) Notice: Subject to any disclaimer, the term of this patent is extended or adjusted under 35 U.S.C. 154(b) by 129 days.

This patent is subject to a terminal disclaimer.

(21) Appl. No.: 17/195,373

(22) Filed: Mar. 8, 2021

(65) Prior Publication Data

US 2021/0186217 A1 Jun. 24, 2021

Related U.S. Application Data

(63) Continuation of application No. 15/706,359, filed on Sep. 15, 2017, now Pat. No. 10,939,762, which is a continuation of application No. 15/424,163, filed on Feb. 3, 2017, now abandoned, which is a continuation of application No. 14/640,659, filed on Mar. 6, 2015, now abandoned.

(60) Provisional application No. 62/290,746, filed on Feb. 3, 2016, provisional application No. 61/948,780, filed on Mar. 6, 2014.

(51) Int. Cl.

| | | |
|---|---|---|
| F16F 1/12 | (2006.01) | |
| A47C 1/034 | (2006.01) | |
| A47C 1/032 | (2006.01) | |
| A47C 7/00 | (2006.01) | |
| A47C 3/02 | (2006.01) | |
| A47C 3/029 | (2006.01) | |
| A47C 3/021 | (2006.01) | |

(52) U.S. Cl.
CPC .......... *A47C 1/034* (2013.01); *A47C 1/03272* (2013.01); *A47C 3/02* (2013.01); *A47C 3/029* (2013.01); *A47C 7/002* (2013.01); *F16F 1/12* (2013.01); *A47C 3/021* (2013.01)

(58) Field of Classification Search
CPC ...... F16F 1/12; F16F 1/128; F16F 2230/0023; A47C 7/62; A47C 7/008; A47C 7/50; A47C 7/002; A47C 3/02; A47C 3/021; A47C 3/023; A47B 91/04
See application file for complete search history.

(56) References Cited

U.S. PATENT DOCUMENTS

| | | |
|---|---|---|
| 77,161 A | 4/1868 | Blake |
| 69,827 A | 5/1869 | Badlam |
| (Continued) | | |

FOREIGN PATENT DOCUMENTS

| | | |
|---|---|---|
| CN | 1864594 A | 11/2006 |
| CN | 200938960 Y | 8/2007 |
| (Continued) | | |

*Primary Examiner* — Nicholas J Lane
(74) *Attorney, Agent, or Firm* — Michael L Leetzow PLLC

(57) ABSTRACT

A spring actuated rocking mechanism can be attached to the legs of a collapsible chair to allow for the user to rock in the collapsible chair. The mechanism may be attached at the factory or retrofitted to the chair. The rocking mechanism can be attached to the end of a leg or disposed within a leg, having a leg portion above and below the mechanism.

16 Claims, 36 Drawing Sheets

(56) References Cited

U.S. PATENT DOCUMENTS

| | | |
|---|---|---|
| 92,758 A | 7/1869 | Smith |
| 97,314 A | 11/1869 | Purington |
| 114,812 A * | 5/1871 | Hartman ............. A47C 7/002 29/896.92 |
| 142,145 A | 8/1873 | Chinchester |
| 165,684 A | 7/1875 | Ober |
| 234,537 A | 11/1880 | Clough |
| 326,165 A | 9/1885 | Short |
| 375,840 A | 1/1888 | Stockton |
| 376,256 A | 1/1888 | Parks |
| 470,707 A | 3/1892 | Unknown |
| 490,366 A | 1/1893 | Seng |
| 585,422 A | 6/1897 | Boenning |
| 1,022,858 A | 4/1912 | Markus |
| 1,273,939 A | 7/1918 | Sidel |
| 1,288,716 A | 12/1918 | Small |
| 1,396,661 A | 11/1921 | Parr |
| 1,798,272 A | 3/1931 | Phillips |
| 1,900,486 A | 3/1933 | Clarin |
| 1,945,580 A | 2/1934 | Eugene |
| 2,056,957 A | 10/1936 | Colbridge |
| 2,280,732 A | 4/1942 | Martin |
| 2,543,273 A | 2/1951 | Beil |
| 2,741,298 A | 4/1956 | Roberts |
| 2,852,883 A | 9/1958 | Walsh |
| 2,862,710 A | 12/1958 | Lewis |
| 3,225,380 A | 12/1965 | Faul |
| 4,118,064 A | 10/1978 | Robeson |
| 4,285,543 A | 8/1981 | Clark |
| 4,306,638 A | 12/1981 | Malott |
| 4,491,335 A | 1/1985 | Evron |
| 4,772,067 A | 9/1988 | Fowler |
| 5,560,675 A | 10/1996 | Altheimer et al. |
| 5,720,473 A | 2/1998 | Thomas |
| 6,100,469 A | 8/2000 | Jorgensen |
| 6,129,415 A | 10/2000 | Galloway |
| 6,398,297 B1 | 6/2002 | Cantwell |
| 6,926,356 B2 | 8/2005 | Chen |
| 7,744,049 B2 | 6/2010 | Kwon et al. |
| 9,060,611 B2 | 6/2015 | Grace |
| 2001/0028187 A1 | 10/2001 | Kielhorn |
| 2006/0027773 A1 | 2/2006 | Nordstrom et al. |
| 2007/0108814 A1 | 5/2007 | Grabowski et al. |
| 2010/0044939 A1 | 2/2010 | Hurwitz |
| 2010/0096894 A1 | 4/2010 | Fukai |
| 2011/0306906 A1 * | 12/2011 | Lin .................. A61H 9/0057 601/13 |
| 2014/0097647 A1 * | 4/2014 | Grace ............... A47C 3/025 297/42 |
| 2015/0250316 A1 | 9/2015 | Penn |
| 2015/0282625 A1 | 10/2015 | Grace |

FOREIGN PATENT DOCUMENTS

| | | |
|---|---|---|
| DE | 1554179 A1 | 5/1970 |
| FR | 1232555 A | 10/1960 |
| JP | 3036662 U | 5/1997 |
| JP | H11318627 A | 11/1999 |
| TW | M293263 U | 7/2006 |

* cited by examiner

US 11,805,907 B2

SPRING ACTUATED ROCKING MECHANISM FOR COLLAPSIBLE CHAIR

REFERENCE TO RELATED CASES

This application is a continuation of application Ser. No. 15/706,359, filed on Sep. 15, 2017, which in turn is a continuation-in-part of application Ser. No. 15/424,163, filed on Feb. 3, 2017, still pending, which in turn claims priority under 35 U.S.C. § 119 (e) to provisional application No. 62/290,746 filed on Feb. 3, 2016, and is also a continuation-in-part application of application Ser. No. 14/640,659, filed on Mar. 6, 2015, abandoned, which in turn claims priority under 35 U.S.C. § 119 (e) to provisional application No. 61/948,780 filed on Mar. 6, 2014, the contents of these applications are also hereby incorporated by reference in their entirety.

BACKGROUND OF THE INVENTION

Field of the Invention

The present invention relates to a spring actuated mechanism as part of a collapsible chair, which enables the user to enjoy a rocking chair type motion during leisure or outdoor activities. Prior practices typically consisted of curved rocking members joined to the front and rear chair legs. These members must be folded as a secondary action by the user upon deploying the chair for use, or compacting the chair for storage. This takes extra time and effort in setting up or putting the chair away.

The invention is intended to be incorporated as an integral part of a collapsible chair frame where a portion of the rear legs of the chair may be replaced by the device. This configuration allows the chair to be folded to its closed configuration without the user disconnecting any other embodiments. This type of rocker also achieves the rocking motion by means of a compressive spring attached to the rear frame members of the chair rather than traditional curved rocking members joined to the front and rear legs of the chair frame.

SUMMARY OF THE INVENTION

The present invention is directed to a rocking mechanism to attach to a single leg of a collapsible chair includes a tubular housing having an interior portion extending between an upper end and a lower end, an upper cap fixedly attached to the tubular housing at the upper end, the cap configured to engage the single leg of the collapsible chair, a lower cap fixedly attached to the tubular housing at the lower end and having an opening therethrough to receive a second leg portion that extends into the interior portion of the tubular housing, a plunger disposed within the interior portion of the tubular housing, the plunger connectable to the second leg portion and having a plurality of rollers disposed about a periphery of the plunger to engage an inside surface of the tubular housing, and a spring disposed in the interior portion of the tubular housing between the upper cap and the lower cap.

In yet another aspect, there is a plunger for a rocking mechanism that includes a base, a flat upper surface on one side of the base, a lower surface on a second side of the base, a cylindrical extension extending downward from the second side, a plurality of tabs extending from the cylindrical extension creating a plurality of spaces, and a plurality of rollers, each of the plurality of rollers disposed in between two of the plurality of tabs.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description of the present embodiments of the invention, and are intended to provide an overview or framework for understanding the nature and character of the invention as it is claimed. The accompanying drawings are included to provide a further understanding of the invention, and are incorporated into and constitute a part of this specification. The drawings illustrate various embodiments of the invention, and together with the description serve to explain the principles and operations of the invention.

DETAILED DESCRIPTION OF THE PREFERRED EMBODIMENTS

Figure 1:
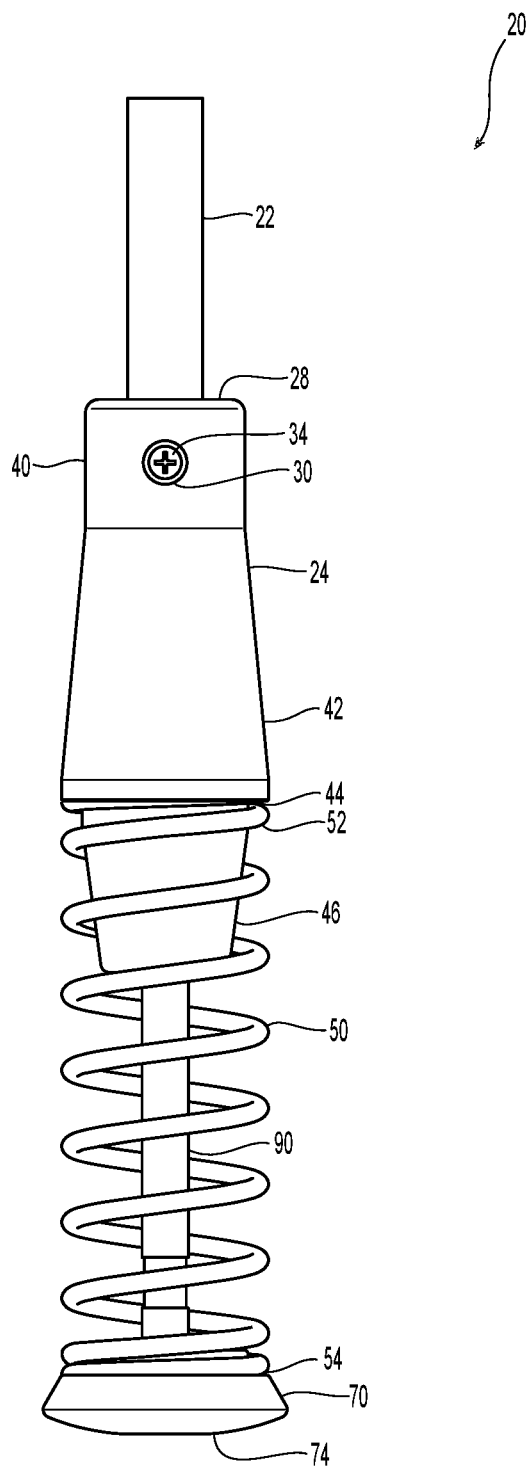
FIG. 1 is a plan view of one embodiment of a rocking mechanism according to the present invention.

Reference will now be made in detail to the present preferred embodiment(s) of the invention, examples of which are illustrated in the accompanying drawings. Whenever possible, the same reference numerals will be used throughout the drawings to refer to the same or like parts.

Figure 2:
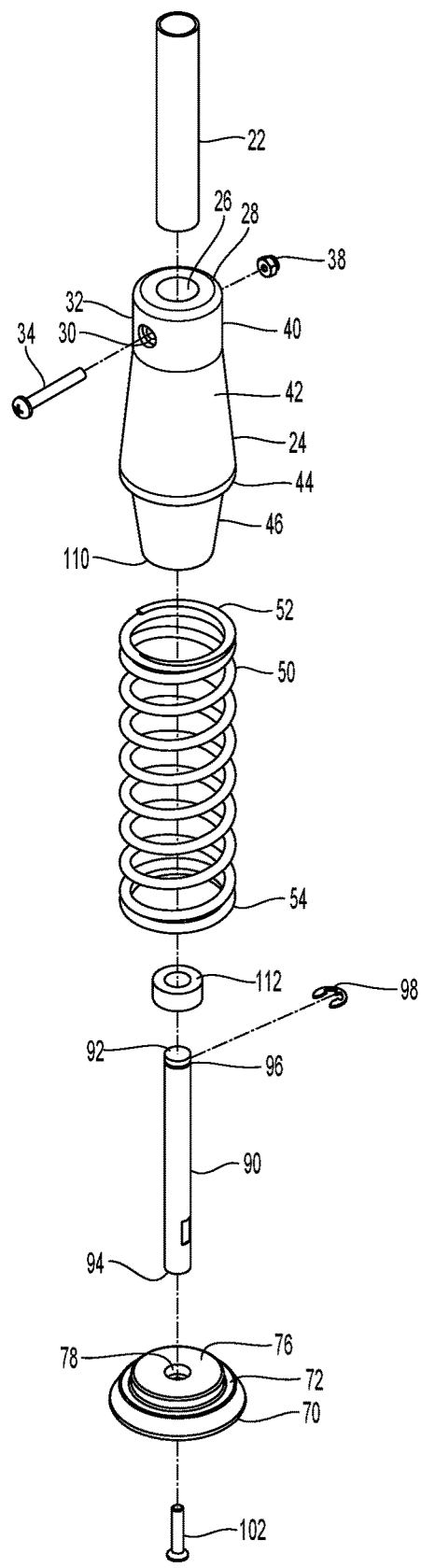
FIG. 2 is a perspective, exploded view of the rocking mechanism of FIG. 1.
Figure 3:
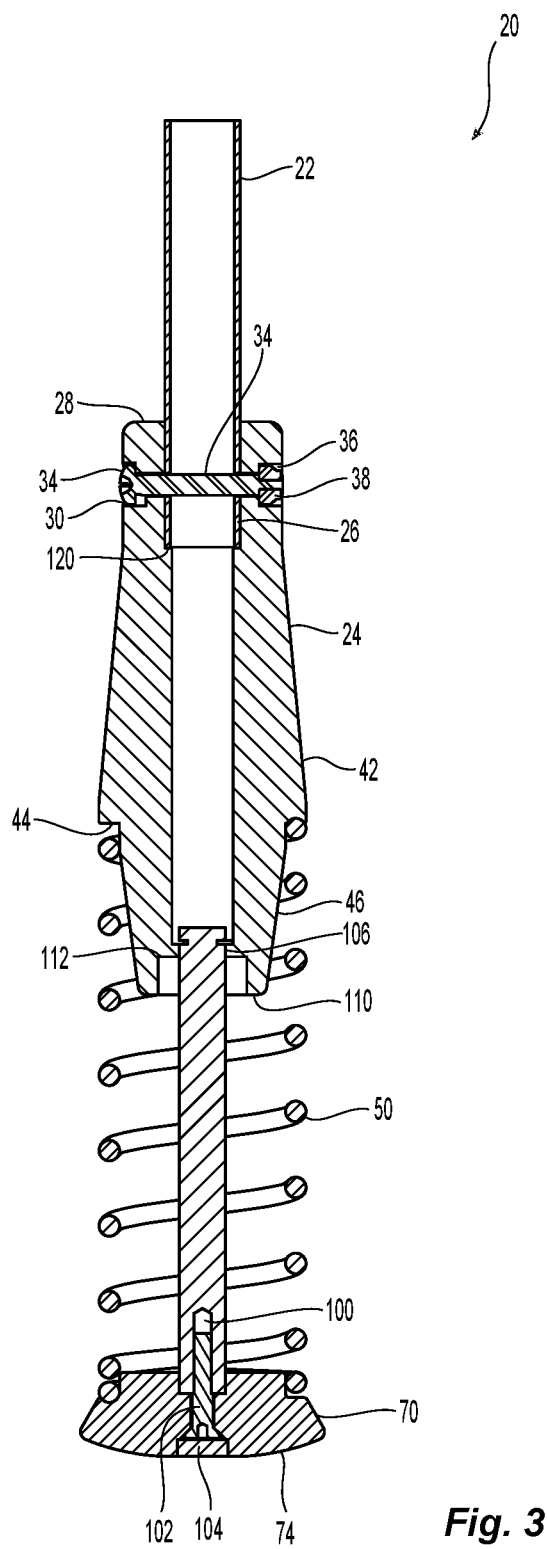
FIG. 3 is a cross section of the rocking mechanism of FIG. 1.

Referring to FIGS. 1-3, a first embodiment of a rocking mechanism 20 is illustrated. The rocking mechanism 20 is preferably attached to a rear leg of a collapsible chair (not shown). Therefore, in order to make a collapsible chair (such as that produced by the current assignee of this patent application and illustrated in U.S. Pat. No. D593,759, the contents of which are hereby incorporated by reference herein), two of the rocking mechanisms 20 can be attached to the rear legs. As one of ordinary skill in the art would recognize, the cross members of the illustrated chair may need to be adjusted to accommodate the rocking mechanisms 20. Clearly, the rocking mechanisms 20 could also be added to other such collapsible chairs. It should also be noted that the rocking mechanisms 20 can be added upon manufacture of the chair or added thereafter. As illustrated in the figures, a portion of a chair leg 22 is illustrated.

The rocking mechanism 20 has an upper portion 24, the upper portion 24 having a first opening 26 in a top end 28, the first opening 26 configured to receive at least a portion of the chair leg 22 of the collapsible chair. The upper portion 24 also has a second opening 30 on a side portion 32, the second opening 30 being configured to receive a securing member 34 to engage and maintain the chair leg 22 in the upper portion 24. As such, the second opening 30 is in communication with the first opening 26. The upper portion 24 may also have a corresponding second second opening 36 to receive another securing member 38. The second second opening 36 is therefore also in communication with the first opening 26. See FIG. 3.

The upper portion 24 may have any number of external configurations and fall within the scope of the present invention. As illustrated, the upper portion 24 includes a generally cylindrical portion 40 adjacent the top end 28, and then a frustoconical portion 42 immediately adjacent the cylindrical portion 40. The frustoconical portion 42 becomes larger in diameter the farther away from the cylindrical portion 40. The upper portion 24 then includes a shoulder 44 that faces away from the top end 28 and the frustoconical portion 42. In fact, the shoulder 44 is formed by the frustoconical portion 42 and a second frustoconical portion 46 that extends distally from the shoulder 44. The second frustoconical portion 46 then decreases in diameter the farther away from the first frustoconical portion 42.

The rocking mechanism also includes a spring 50, the spring 50 having a first end 52 that is disposed against the shoulder 44 of the upper portion 24. The first end 52 of the spring 50 engages the shoulder 44 and surrounds at least a portion of the second frustoconical portion 46. The spring 50 is preferably a coil spring, but other configurations are possible as well. The spring 50 has a second end 54 that engages a lower portion 70. The lower portion 70 is configured to engage the second end (distal end) 54 of the spring 50. Specifically, the lower portion 70 has a shoulder 72 facing upwards and toward the upper portion 24. The lower portion 70 preferably has a rounded surface 74 on an opposite side of the lower portion 70 from the shoulder 72. The lower portion 70 also includes a projection 76 radially inward from the shoulder 72 to assist in centering the spring 50 on the lower portion 70 and the shoulder 72. The lower portion 70 may also have a center opening 78 that holds a guide member, as discussed in detail below.

The rocking mechanism 20 also includes a guide member 90 that extends between the upper portion 24 and the lower portion 70. The guide member 90 has a first end 92 and a second end 94. The first end 92 of guide member 90 includes a circular groove 96 extending around the periphery of guide member 90. The groove 96 is configured to receive therein a circular retaining clip 98. The second end 94 guide member 90 has a longitudinal opening 100 therein to receive a fastening member 102. The fastening member 102 extends through the center opening 78 of the lower portion 70 to engage the guide member 90 and maintain it in a fixed relation thereto. The fastening member 102 is preferably a threaded screw to engage corresponding threads inside the longitudinal opening 100 of the guide member 90. A cap 104 is also provided to be press-fit into the center opening 78 from the rounded surface 74.

The first end 92 of the guide member 90 is movable within the first opening 26, which as best illustrated in FIG. 3 extends throughout the length of the upper portion 24. Extending into the first opening 26 toward the distal end thereof and adjacent to the second frustoconical portion 46 is an inward extending ring 106. The guide member 90, having the retaining clip 98 inserted into the groove 96, is inserted into the first opening 26. The retaining clip 98 in gauges the inward extending ring 106 to prevent the guide member 90 from falling out the bottom end 110 of the upper portion 24. The spring 50 is then disposed over and around the guide member 90 and the second frustoconical portion 46 to engage the shoulder 44. The lower portion 70 is then attached to the guide member 90 as discussed above. The second end 54 of spring 50 engages the upward facing shoulder 72 of the lower portion 70.

A bushing 112 is preferably disposed in the bottom end 110 of the upper portion 24. As best seen in FIG. 3, the bushing 112 aligns and provides a wearable surface during linear movement of the guide member 90 in and out of the first opening 26 during use. As can be imagined, applying force to the rocking mechanism 20 through the chair leg 22 causes compression of the spring 50, lowering of the upper portion 24 relative to the lower portion 70 thereby causing the guide member 92 move upward in the first opening 26. Thus, the bushing 112 helps to keep the upper portion 24, the spring 50, and the lower portion 70, in alignment during use.

The upper portion 24 and the lower portion 70 are preferably made from a high density polyethylene. The bushing 112 is preferably made of acetyl resin, while the guide member 90 is preferably made from stainless steel. The other parts of the rocking mechanism 20 are all preferably made from steel. It should be noted however that other appropriate materials may be used in the manufacture of the rocking mechanism 20 and still fall within the scope of the present invention.

It should be noted that the first opening 26 has a larger diameter adjacent the top end 28 of the upper portion 24. The change in diameter of the first opening 26 below the second openings 30, 36 provides for a shoulder 120 that supports the end of chair leg 22.

Figure 4:
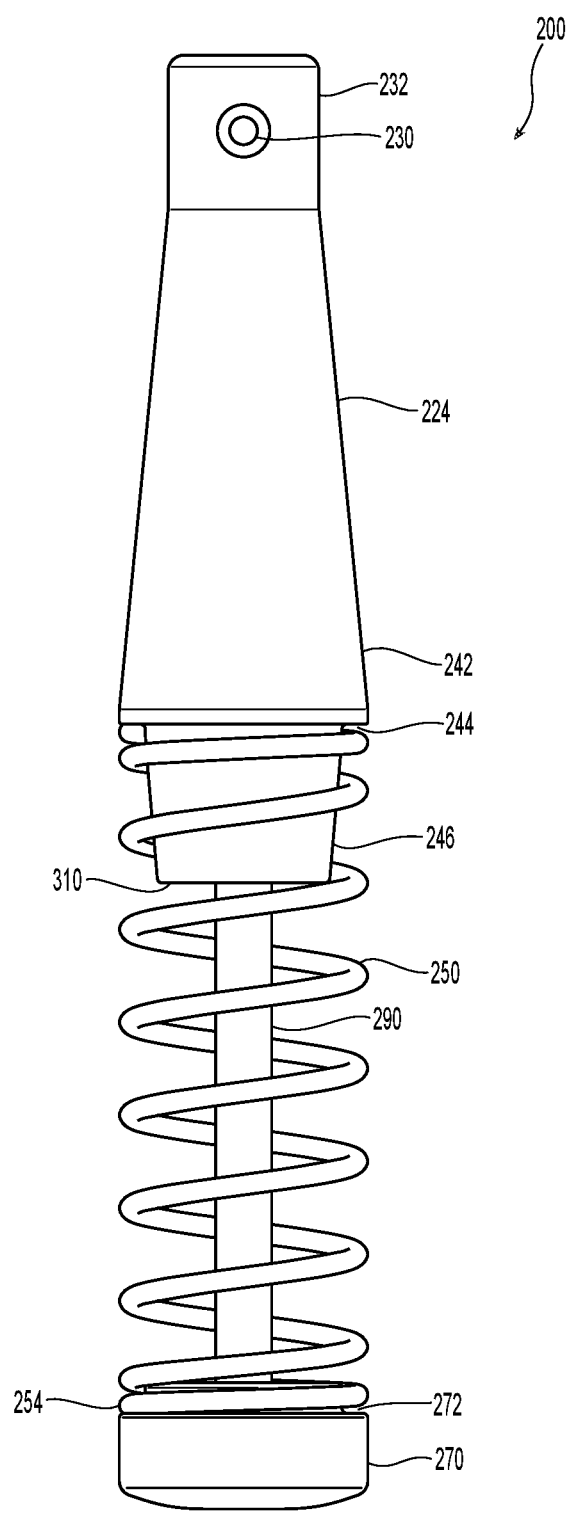
FIG. 4 is a plan view of another embodiment of a rocking mechanism according to the present invention.
Figure 5:
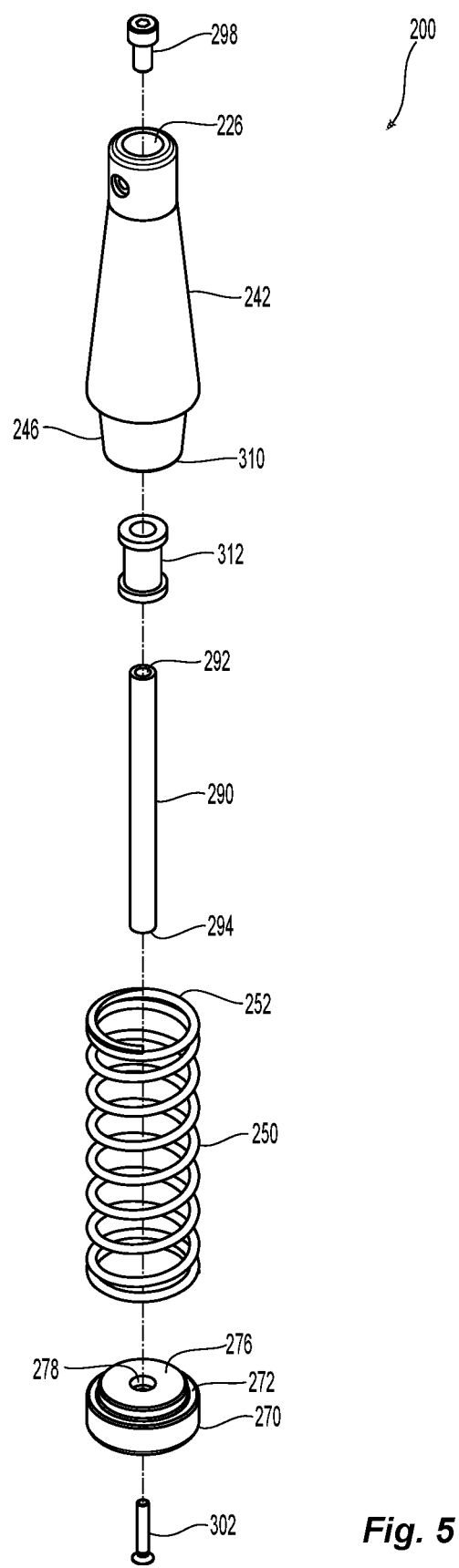
FIG. 5 is a perspective, exploded view of the rocking mechanism of FIG. 4.
Figure 6:
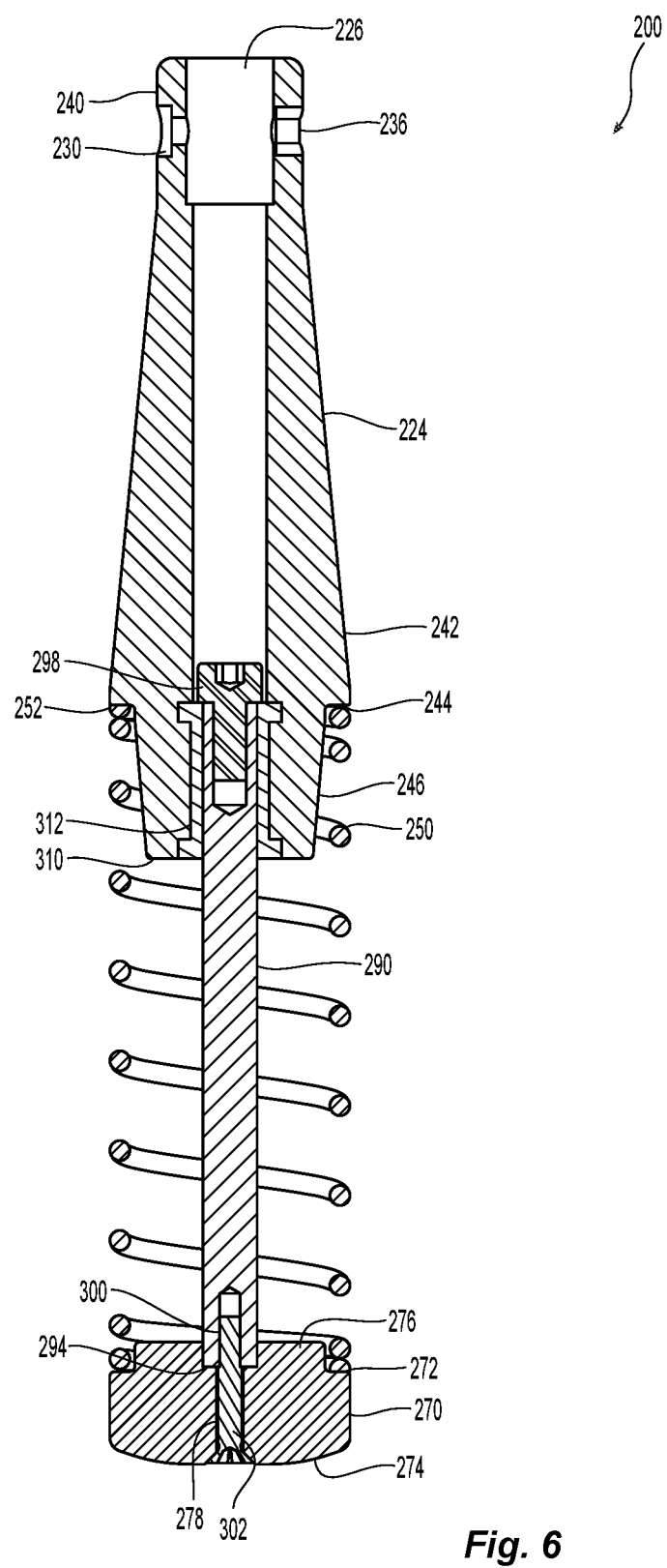
FIG. 6 is a cross section of the rocking mechanism of FIG. 4.
Figure 7:
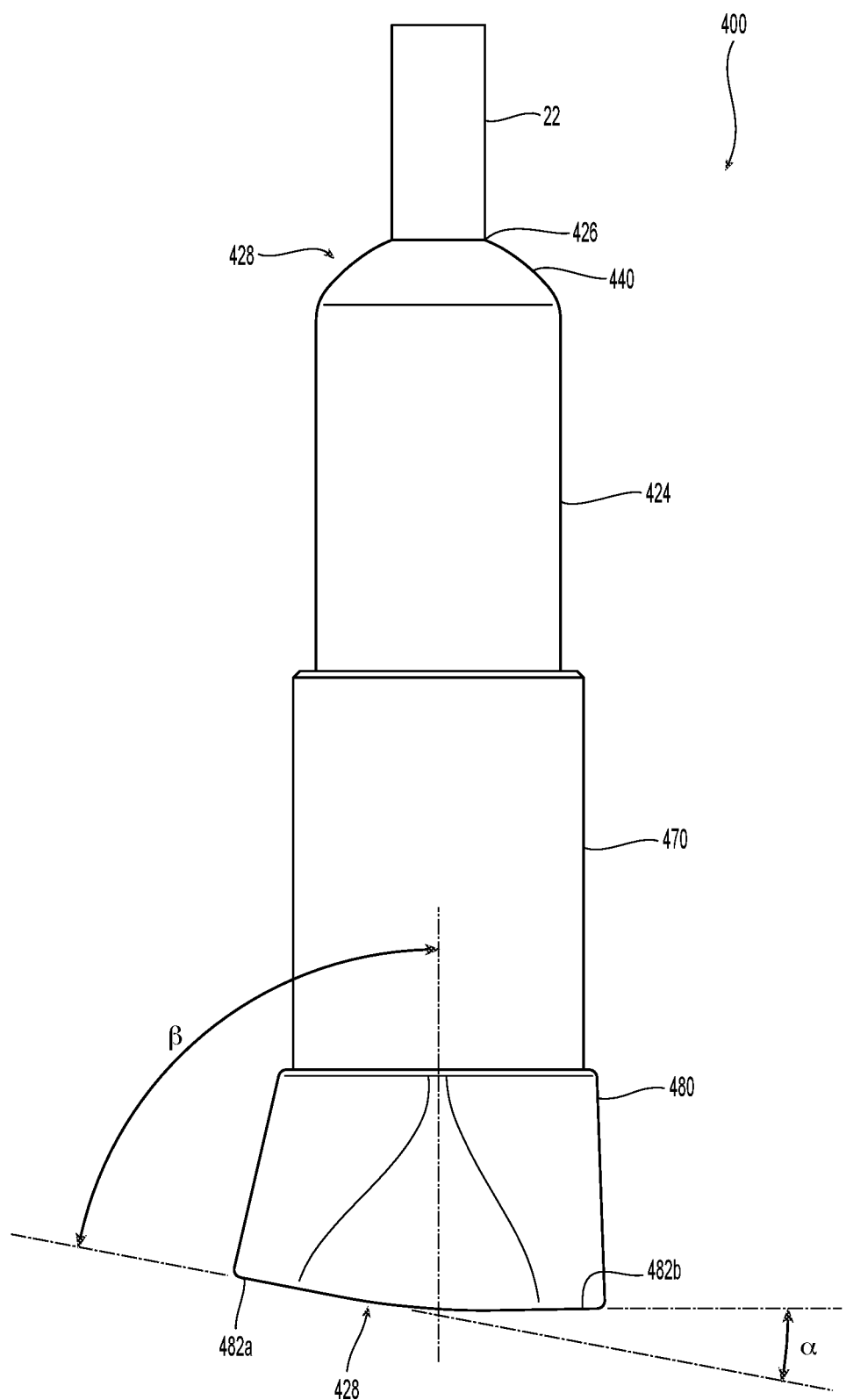
FIG. 7 is a plan view of another embodiment of a rocking mechanism according to the present invention.
Figure 8:
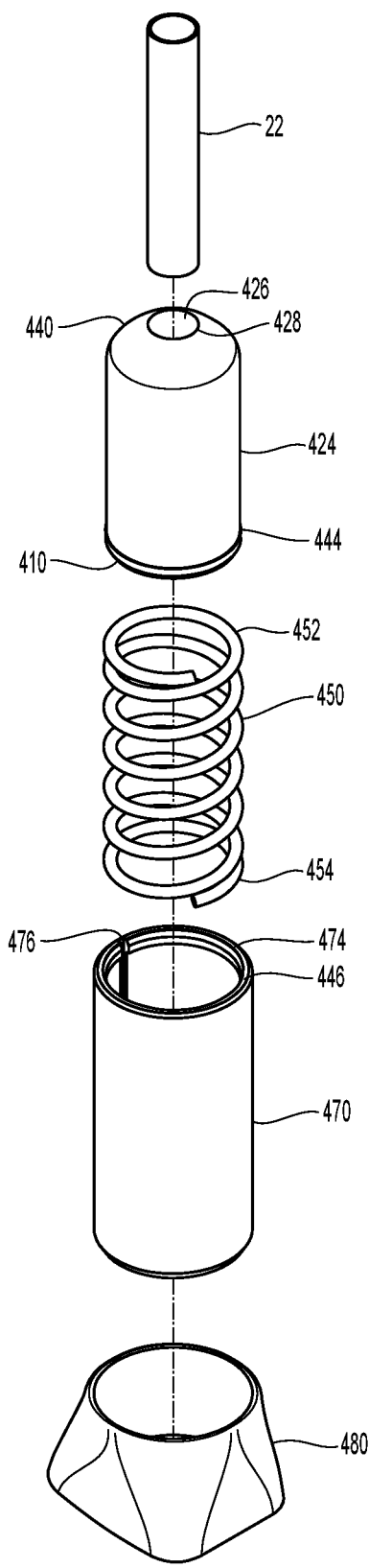
FIG. 8 is a perspective, exploded view of the rocking mechanism of FIG. 7.
Figure 9:
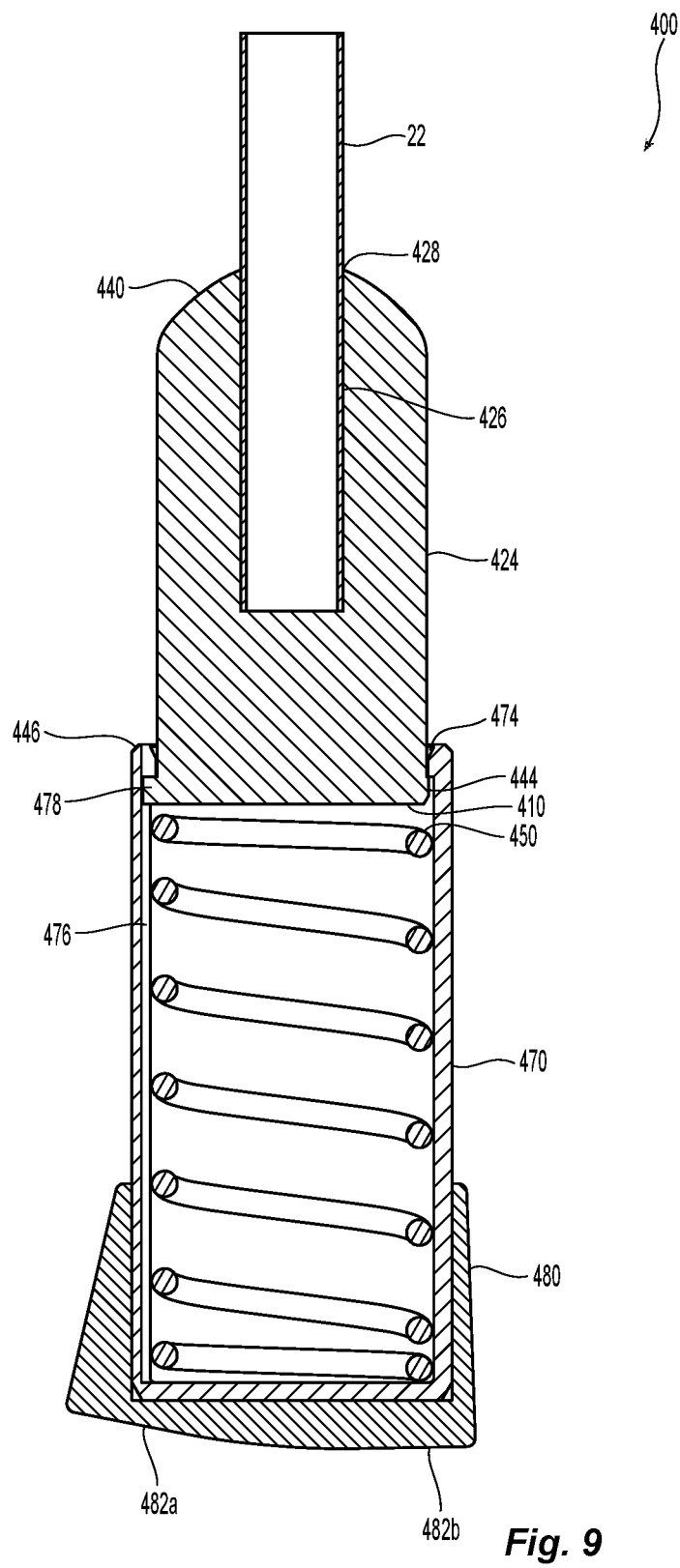
FIG. 9 is a cross section of the rocking mechanism of FIG. 7.

A second embodiment of a rocking mechanism 200 is illustrated in FIGS. 4-6. While many of the components in rocking mechanism 200 are similar to rocking mechanism 20, the chair leg 22 has been omitted. It is understood, however, that a chair leg such as leg 22 would be fixed to the rocking mechanism 200 in the same manner as described above.

The rocking mechanism 200 has an upper portion 224, the upper portion 224 having a first opening 226 in a top end 228 configured to receive at least a portion of a chair leg of a collapsible chair. The upper portion 224 also has a second opening 230 on a side portion 232, the second opening 230 being configured to receive a securing member (not shown, but may be the same as or similar to the one for rocking mechanism 20) to engage and maintain the chair leg in the upper portion 224. As such, the second opening 230 is in communication with the first opening 226. The upper portion 224 may also have a corresponding second second opening 236 to receive another securing member. The second second opening 236 is therefore also in communication with the first opening 226. See FIG. 6.

The upper portion 224 may, like the other embodiment, have any number of external configurations and still fall within the scope of the present invention. As illustrated, the upper portion 224 includes a generally cylindrical portion 240 adjacent the top end 228, and then a frustoconical portion 242 immediately adjacent the cylindrical portion 240. The frustoconical portion 242 becomes larger in diameter the farther away from the cylindrical portion 240. The upper portion 224 then includes a shoulder 244 that faces away from the top end 228 and the frustoconical portion 242. In fact, the shoulder 244 is formed by the frustoconical portion 242 and a second frustoconical portion 246 that extends distally from the shoulder 244. The second frustoconical portion 246, which is substantially shorter than the first frustoconical portion 242, then decreases in diameter the farther away from the first frustoconical portion 242.

The rocking mechanism 200 also includes a spring 250, the spring 250 having a first end 252 that is disposed against the shoulder 240 of the upper portion 224. The first end 252 of the spring 250 engages the shoulder 244 and surrounds at least a portion of the second frustoconical portion 246. The spring 250 is preferably a coil spring, but other configurations are possible as well. The spring 250 has a second end 254 that engages a lower portion 270. The lower portion 270 is configured to engage the second end (distal end) 254 of the spring 250. The lower portion 270 has a shoulder 272 facing upwards and toward the upper portion 224. The lower portion 270 is thicker than the lower portion 70 of the first embodiment, but also preferably has a rounded surface 274 on an opposite side of the lower portion 270 from the shoulder 272. The lower portion 272 also includes a projection 276 disposed radially inward from the shoulder 272 to assist in centering the spring 250 on the lower portion 270. The lower portion may also have a center opening 278 that holds a guide member, as discussed in detail below.

The rocking mechanism 200 also includes a guide member 290 that extends between the upper portion 224 and the lower portion 270. The guide member 290 has a first end 292 and a second end 294. The second end 294 of guide member 290 has a longitudinal opening 300 therein to receive a fastening member 302. The fastening member 302 extends through the center opening 278 of the lower portion 270 to engage the guide member 290 and maintain it in a fixed relation thereto. The fastening member 302 is preferably a threaded screw to engage corresponding threads inside the longitudinal opening 300 of the guide member 290.

The first end 292 of the guide member 290 is movable with in the first opening 226, which as best illustrated in FIG. 6, extends throughout the length of the upper portion 224. A bushing 312 is preferably disposed in the bottom end 310 of the upper portion 224. As illustrated in FIG. 6, the bushing 312, which is preferably made from a self-lubricating metal such as brass, aligns and provides a wearable surface during linear movement of the guide member 290 in and out of the first opening 226 during use. The bushing 312 is preferably injection-molded into the upper portion 224. As can be imagined, applying force to the rocking mechanism 200 through the chair leg causes compression of the spring 250, lowering the upper portion 224 relative to the lower portion 270 thereby causing the guide member 292 to move upward in the first opening 226. Thus, the bushing 312 helps to keep the upper portion 224, the spring 250, and the lower portion 270 in alignment during use.

The guide member 290 is combined with a retaining member 298 inserted into the first end 292 of the guide member 290. The retaining member 298 is preferably a screw that engages with threads in a longitudinal opening at the first end 292 of the guide member 290. The retaining member 298 which has a larger head diameter than that of the guide member 290, engages the bushing 312 to prevent the guide member 290 from falling out the bottom end 310 of the upper portion 224. The spring 250 is then disposed over and around the guide member 290 end the second frustoconical portion 246 to engage the shoulder 244. The lower portion 270 is then attached to the guide member 290 as discussed above. The second end 254 of spring 250 engages the upward facing shoulder 272 of the lower portion 270.

Another embodiment of a rocking mechanism 400 is illustrated in FIGS. 7-10. The rocking mechanism 400 has an upper portion 424, the upper portion 424 having a first opening 426 in a top end 428, the first opening 426 configured to receive at least a portion of the chair leg 22 of the collapsible chair. While not illustrated, the upper portion 424 may also have a second opening configured to receive a securing member to engage and maintain the chair leg 22 in the upper portion 424 as with other embodiments.

The upper portion 424 may, like the other embodiments, have any number of external configurations and still fall within the scope of the present invention. As illustrated, the upper portion 424 includes a generally rounded (or domed) portion 440 adjacent the top end 428, and then a cylindrical portion 442 immediately adjacent the rounded portion 440. The cylindrical portion 442 terminates with a circumferential ring 444 (for reasons discussed below) and a flat bottom end 410 that faces away from the top end 428.

The rocking mechanism 400 also includes a spring 450, the spring 450 having a first end 452 that is disposed against the bottom end 410 of the upper portion 424. The spring 450 is preferably a coil spring, but other configurations for the spring 450 are possible as well. The spring 450 has a second end 454 that engages a lower portion 470. The lower portion 470 is generally cylindrical and is configured to receive the second end (distal end) 454 of the spring 450 and at least a portion of the upper portion 424. In particular, the lower portion 470 has a flat bottom 472 to engage the second end (distal end) 454 of the spring 450. Around the inside of lower portion 470 at a top end 446 thereof is an annular ring 474 to engage the circumferential ring 444 of the upper portion 424 to keep the spring 450 from separating the lower portion 470 from the upper portion 424. The two rings 444, 474 engage one another, preventing the lower portion 470 from exiting the upper portion 424. The two portions 424, 470 can be snap fit together. As a result of this configuration, it should be noted that the top end 478 of the lower portion 470 is always positioned between the top end 428 and the bottom end 410 of the upper portion 424.

Figure 10:
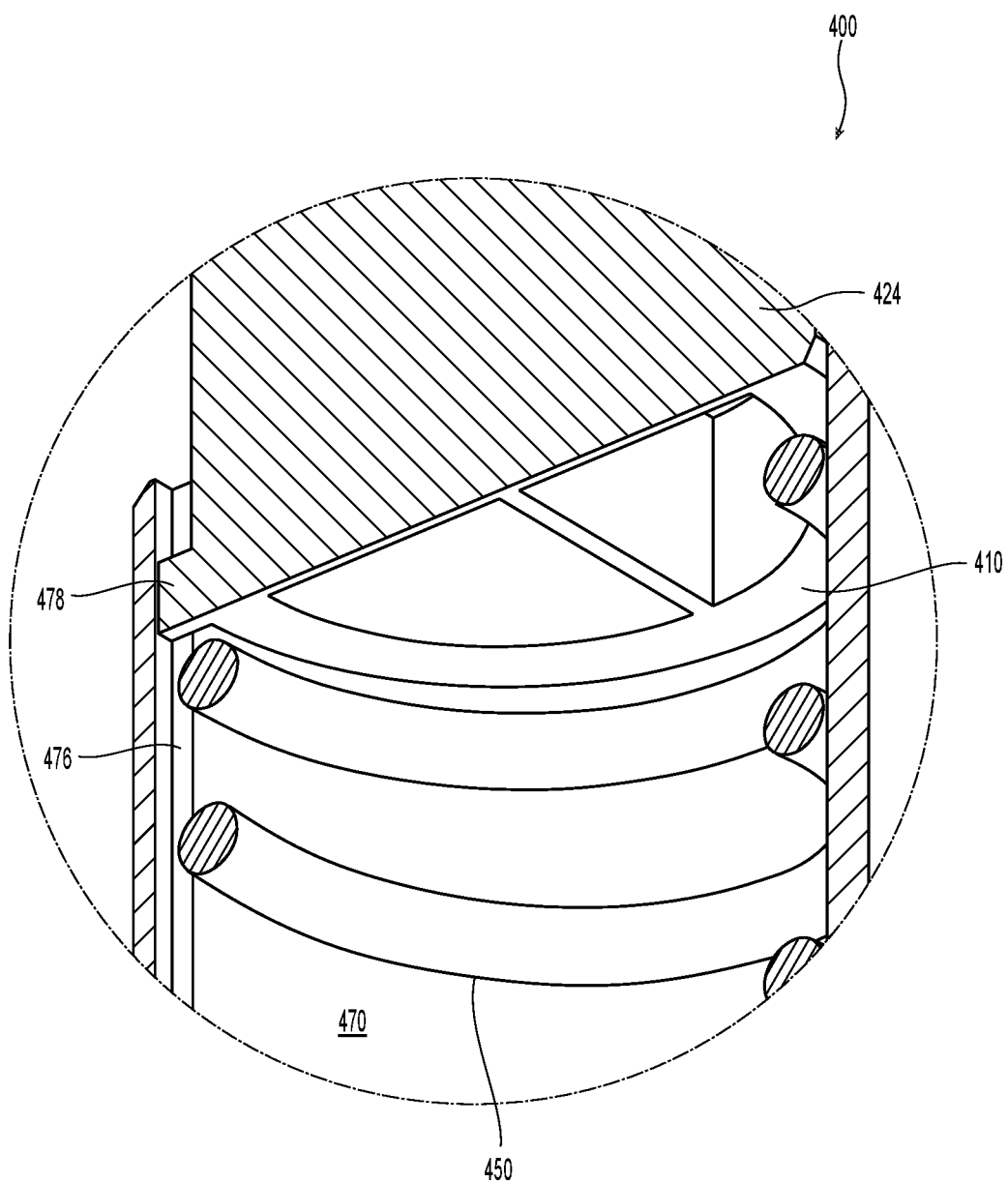
FIG. 10 is an enlarged perspective cross-sectional view of a portion of the top and bottom portions of the rocking mechanism of FIG. 1 showing the alignment member and alignment groove.

The lower portion 470 also has a vertically oriented groove 476 that cooperates with a projection 478 on the upper portion 424. See FIG. 9. FIG. 10, a perspective view of the rocking mechanism 400 in cross section, shows the projection 478 on the upper portion 424 engaging the vertically oriented groove 476. The combination of the groove 476 and the projection 478 prevents the lower portion 470 and the upper portion 424 of the rocking mechanism 400 from rotating relative to one another. This is important as rocking mechanism 400 has a foot portion 480 into which the lower portion 470 is placed. The foot portion 480 has a curved bottom portion 482 to assist with the rocking motion. The curved bottom portion 482 has two generally flat surfaces 482a, 482b that lie in two different planes that form an angle ∞, which is about 28°. The surface 482b forms an angle β with a center line of the rocking mechanism—see FIG. 7. Preferably, this angle is about 76°. Since the curved bottom portion 482 has surfaces that are direction oriented, unlike the embodiments disclosed above, the foot portion 480 needs to be maintained in the correct orientation. The combination of the groove 476 and the projection 478 maintain this orientation.

Figure 11:
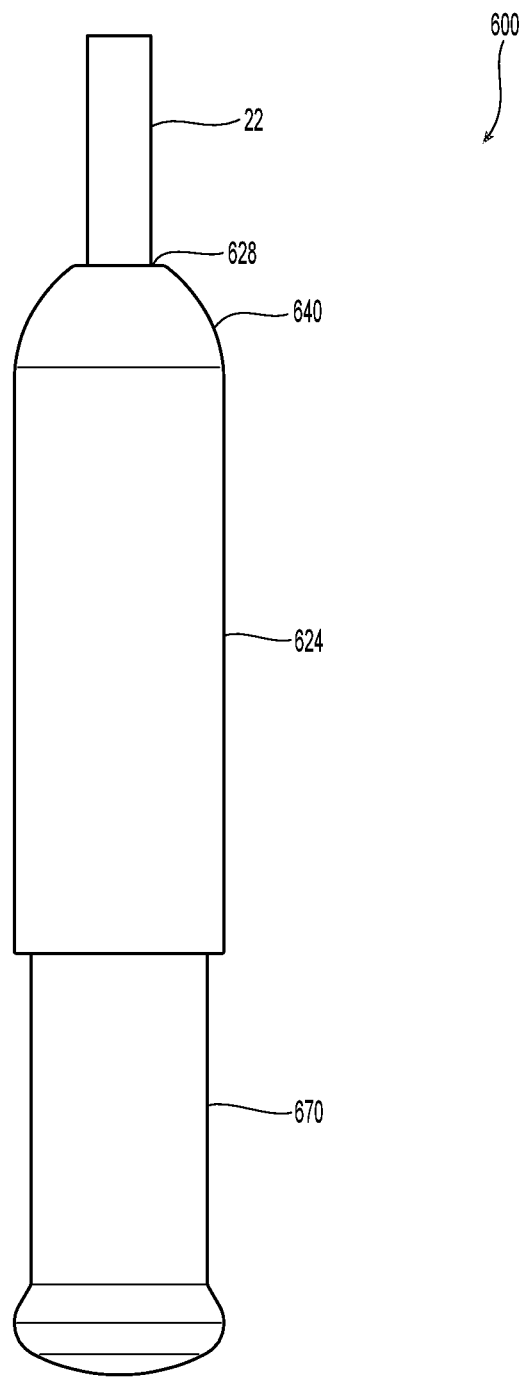
FIG. 11 is a plan view of another embodiment of a rocking mechanism according to the present invention.
Figure 12:
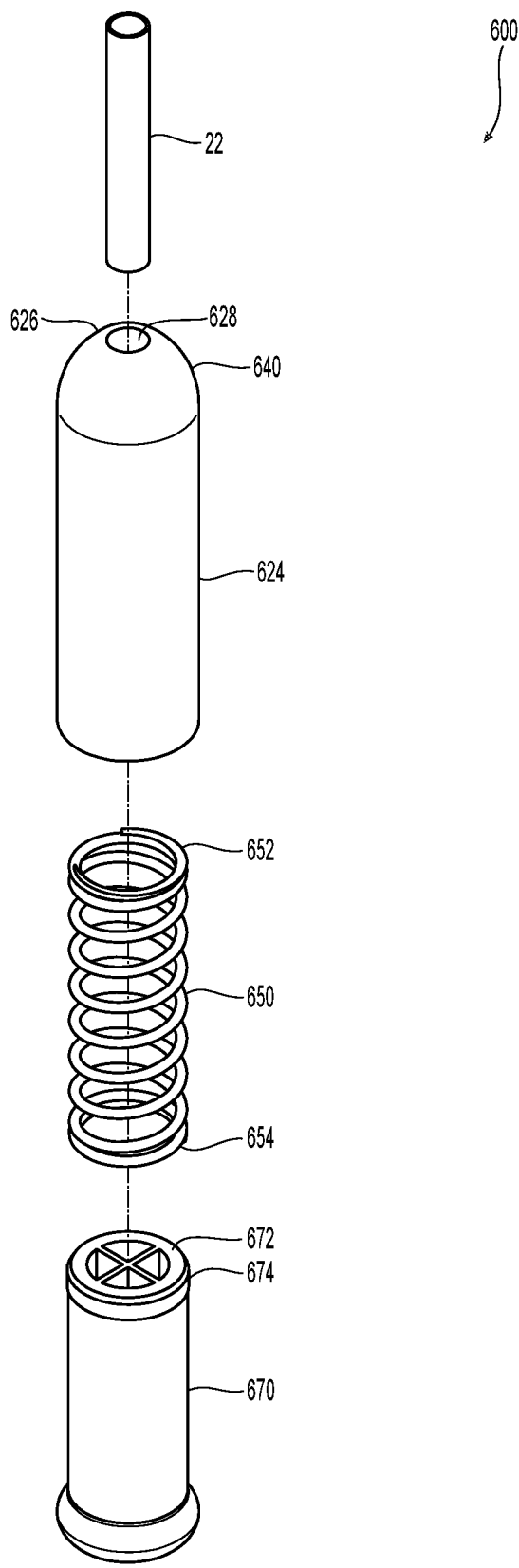
FIG. 12 is a perspective, exploded view of the rocking mechanism of FIG. 11.
Figure 13:
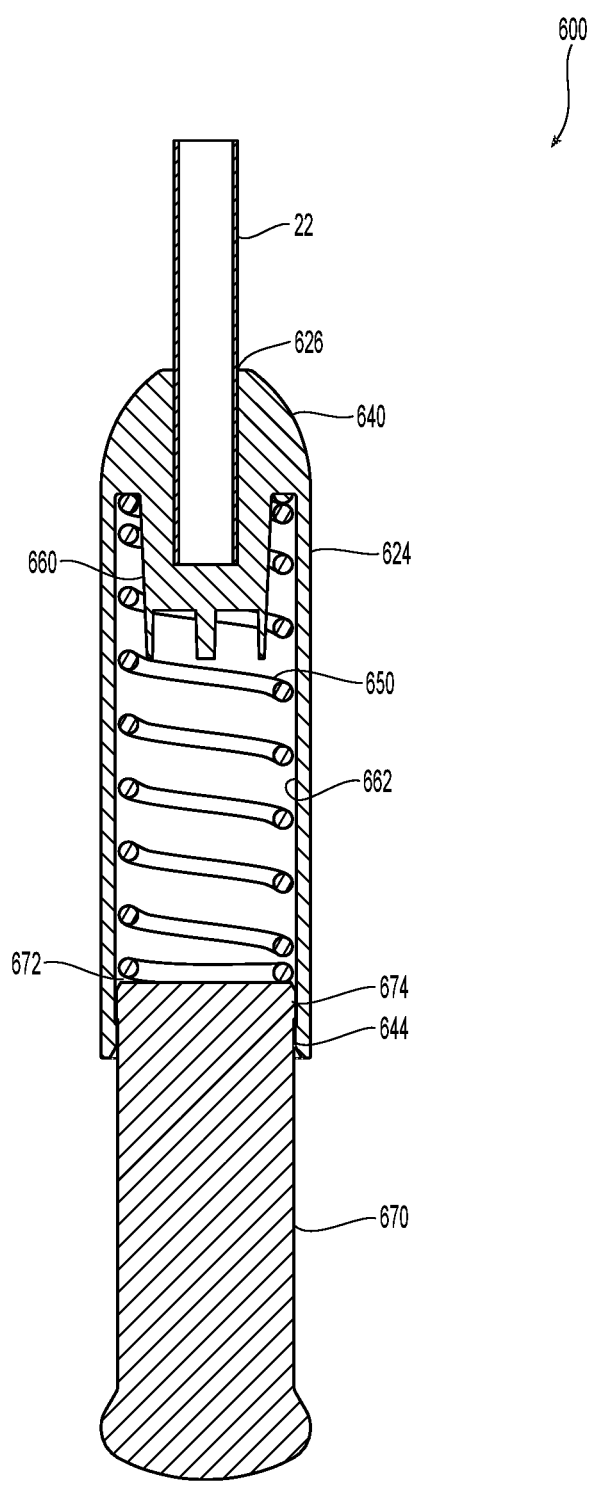
FIG. 13 is a cross section of the rocking mechanism of FIG. 11.

Another embodiment of a rocking mechanism 600 is illustrated in FIGS. 11-13. The rocking mechanism 600 has an upper portion 624, the upper portion 624 having a first opening 626 in a top end 628, the first opening 626 configured to receive at least a portion of the chair leg 22 of the collapsible chair. While not illustrated, the upper portion 624 may also have a second opening configured to receive a securing member to engage and maintain the chair leg 22 in the upper portion 624 as with the other embodiments.

The upper portion 624 may, like the other embodiments, have any number of external configurations and still fall within the scope of the present invention. As illustrated, the upper portion 624 includes a generally rounded (or domed) portion 640 adjacent the top end 628, and then a cylindrical portion 642 immediately adjacent the rounded portion 640. The cylindrical portion 642 is generally hollow and extends downward sufficiently far enough so as to contain the spring 650. The cylindrical portion 642 has a projection 660 that extends downward from the domed portion 640 to engage the spring 650 and maintain it centrally in the rocking mechanism 600. The upper portion 624 has an inner surface 662 that has a circumferential ring 644 extending into the cylindrical portion 642 to engage the lower portion 670 as discussed below.

The rocking mechanism 600 also includes a spring 650, the spring 650 having a first end 652 that is disposed against projection 660 of the upper portion 624. The spring 650 is preferably a coil spring, but other configurations of the spring 650 are possible as well. The spring 650 has a second end 654 that engages the lower portion 670. The lower portion 670 is generally cylindrical and has a flat top surface 672 to engage the second end (distal end) 654 of the spring 650. Around the outside of lower portion 670 is an annular ring 674 to engage the circumferential ring 644 of the upper portion 624 to keep the spring 650 from separating the lower portion 670 from the upper portion 624. The two rings 644, 674 engage one another, preventing the lower portion 670 from exiting the upper portion 624. The two portions 624, 660 can be snap fit together. The bottom of the lower portion 670 is rounded as with the first two embodiments to assist in the rocking motion of the chair.

Figure 14:
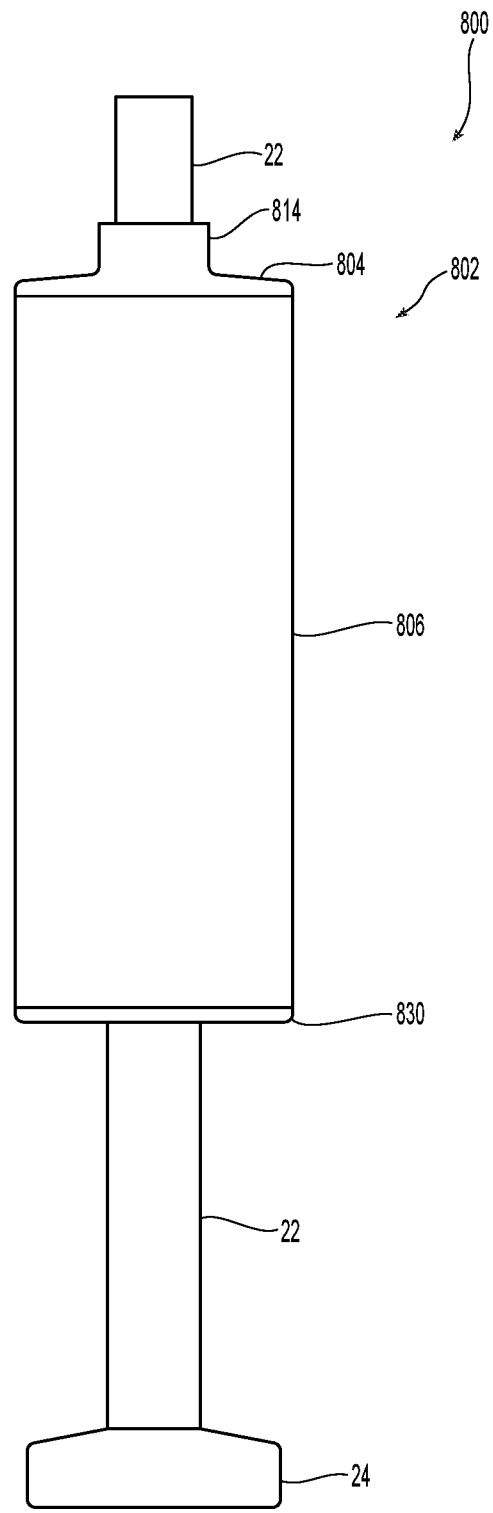
FIG. 14 is a plan view of another embodiment of a rocking mechanism according to the present invention.
Figure 15:
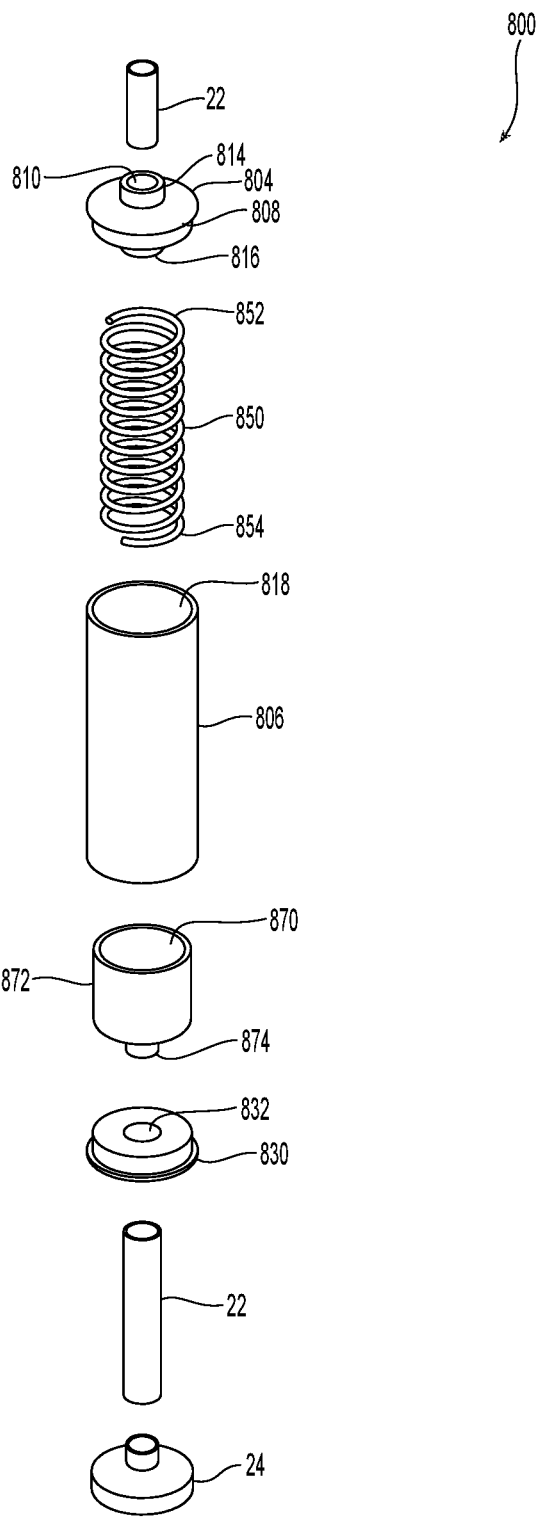
FIG. 15 is a perspective, exploded view of the rocking mechanism of FIG. 14.
Figure 16:
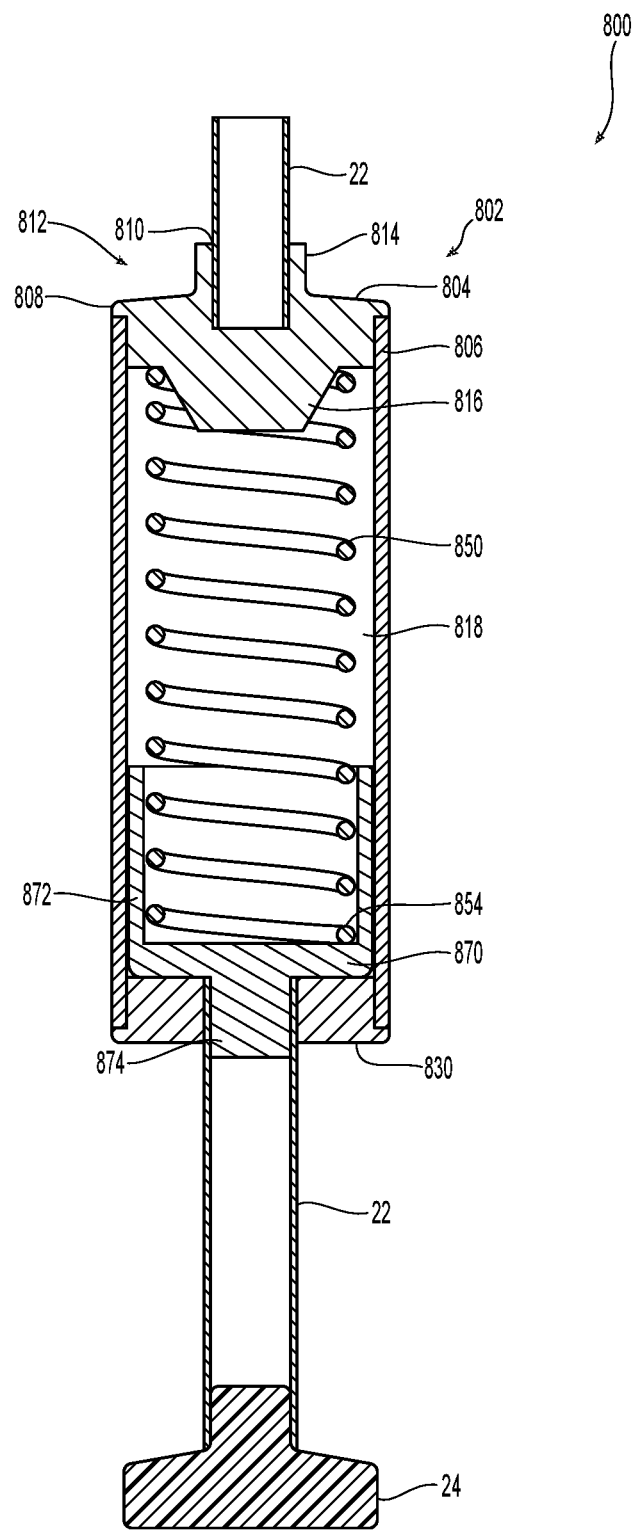
FIG. 16 is a cross section of the rocking mechanism of FIG. 14.
Figure 17:
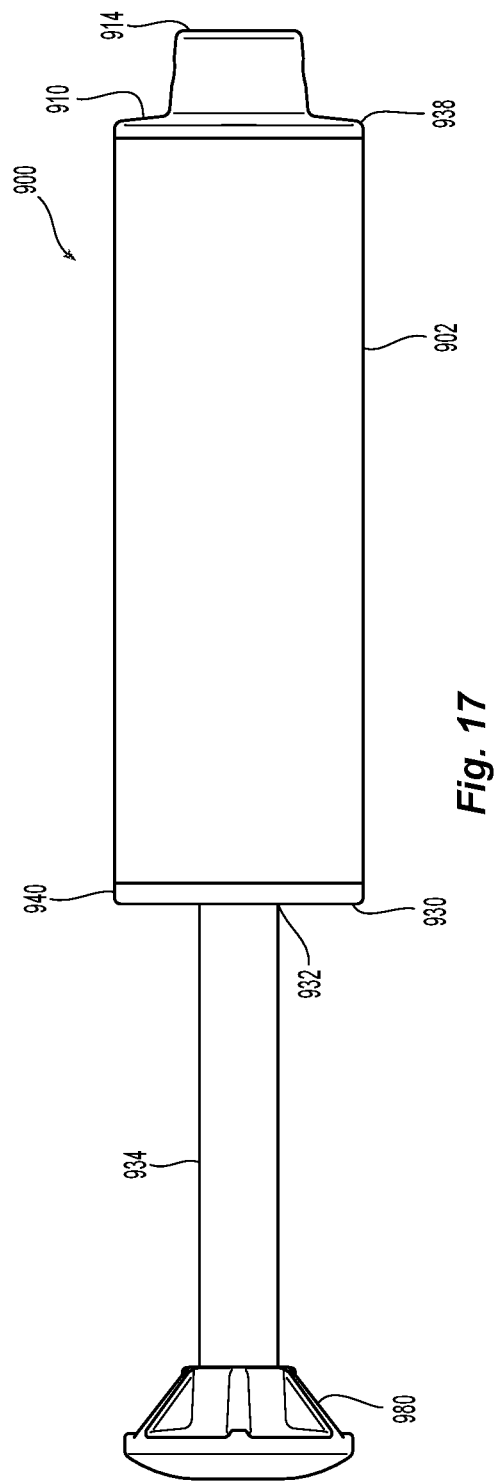
FIG. 17 is a plan view of another embodiment of a rocking mechanism according to the present invention.

Rocking mechanism 800 is illustrated in FIGS. 14-16. Rocking mechanism 800 is configured to be inserted into the leg of a collapsible chair, rather than be on the end portion of a leg as with the prior embodiments. As such, rocking mechanism 800 has leg portions 22 connected to both ends thereof, with a foot 24 attached to the bottom leg 22. Rocking mechanism 800 has an upper portion 802 that includes a cap 804 and a cylinder 806. The cap 804 and the cylinder 806 are illustrated as two pieces but they could be made as one integral unit. The cap 804 and the cylinder 806 can be secured to one another by a press-fit, since the cap 804 has a lip 808 that engages the cylinder 806 to prevent the cap 804 from being inserted too far. Additionally, the cap 804 and the cylinder 806 can be attached to one another by any other method, such as with an adhesive, welded, ultrasonically welded, with screws or rivets, etc. The cap 804 has an opening 810 on the top side 812 thereof that is configured to receive the upper portion of the chair leg 22. The top side 812 includes a cylindrical portion 814 that could have an opening therein to accept a securing member to secure the leg 22 in the opening 810. Alternatively, the chair leg 22 can be secured into the opening 810 by a press-fit, adhesives, welding, etc. The underside of the cap 804 has a centrally located projection 816 that extends into the cylinder 806. The projection 816 centers a spring 850 within an interior space 818 in the cylinder 806.

The rocking mechanism 800 also has a lower portion 870 that is at least partially disposed within the interior space 818 of the cylinder 806 of the upper portion 802. The lower portion 870 has a cup-shaped main portion 872 and a projection 874 extending from the bottom side 876 thereof. The projection 874 is configured to engage the lower leg 22.

As illustrated in FIG. 16, the projection 874 is inserted into the lumen of the leg 22. However, the lower portion 870 may also be configured such that the leg 22 is inserted into an opening in the lower portion 870. The main portion 872 is configured to receive an end 854 of the spring therein. The lower portion 870 is movable relative the upper portion 802 and in particular, the lower portion 870 slides up and down in the interior space 818 of the cylinder 806.

To maintain the lower portion 870 in the upper portion 802, a sealing member 830 is used. The sealing member 830, similar to the cap 804, is partially inserted into the interior space 818 of the cylinder 806. The projection 874 protrudes through an opening 832 in the sealing member 830. The opening 832 may also be large enough to allow the leg 22 to be inserted therein as well. The sealing member 830 may be secured to the cylinder 806 in any appropriate manner, as discussed above.

While it is noted that the upper leg 22 is inserted into the opening 810, the rocking mechanism 800 can be inverted relative to the chair so that the lower leg 22 is inserted into the opening 810.

Another embodiment of a rocking mechanism 900 is illustrated in FIGS. 17-22. The rocking mechanism 900 has a tubular housing 902 that defines an interior portion 904 extending between an upper end 906 and a lower end 908. There is an upper cap 910 fixedly attached to the tubular housing 902 at the upper end 906, the upper cap 910 is configured to engage the single chair leg (not shown). In one embodiment, the upper cap 910 has a first opening 912 in a top end 914, the first opening 912 configured to receive at least a portion of the chair leg of the collapsible chair. The upper cap 910 may also have a second opening 916 configured to receive a securing member to engage and maintain the chair leg in the upper cap 910 as with other embodiments. Alternatively, the chair leg can be secured into the opening 912 by a press-fit, adhesives, welding, threaded-engagement, etc. The underside of the upper cap 910 has a centrally located projection 918 that extends into the interior portion 904. The projection 918 centers a spring 920 within the interior portion 904 in the tubular housing 902.

Figure 18:
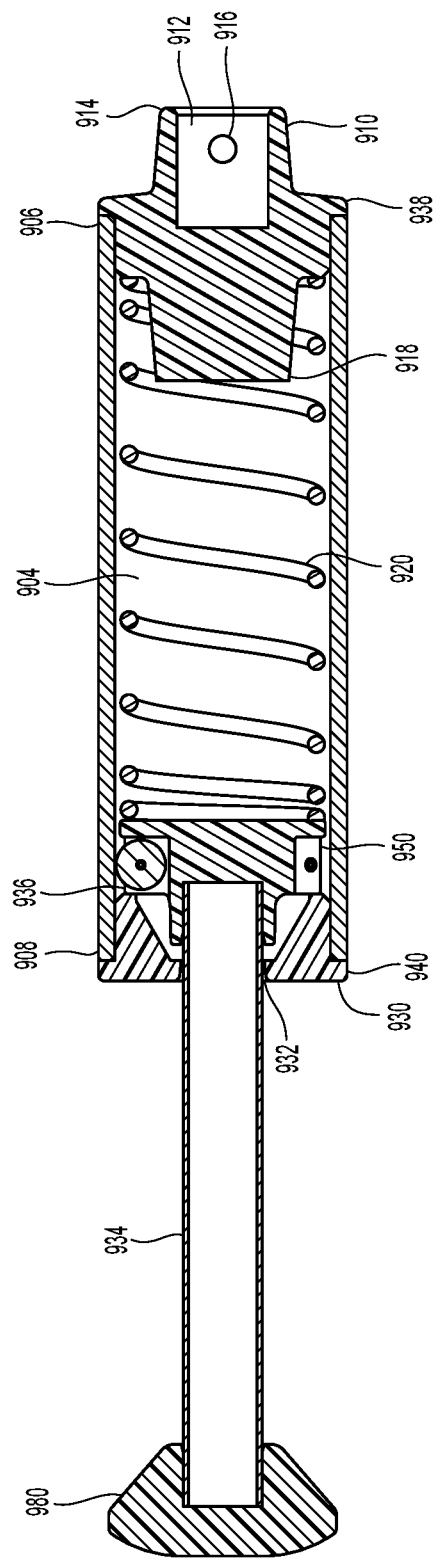
FIG. 18 is a cross section of the rocking mechanism of FIG. 17.
Figure 19:
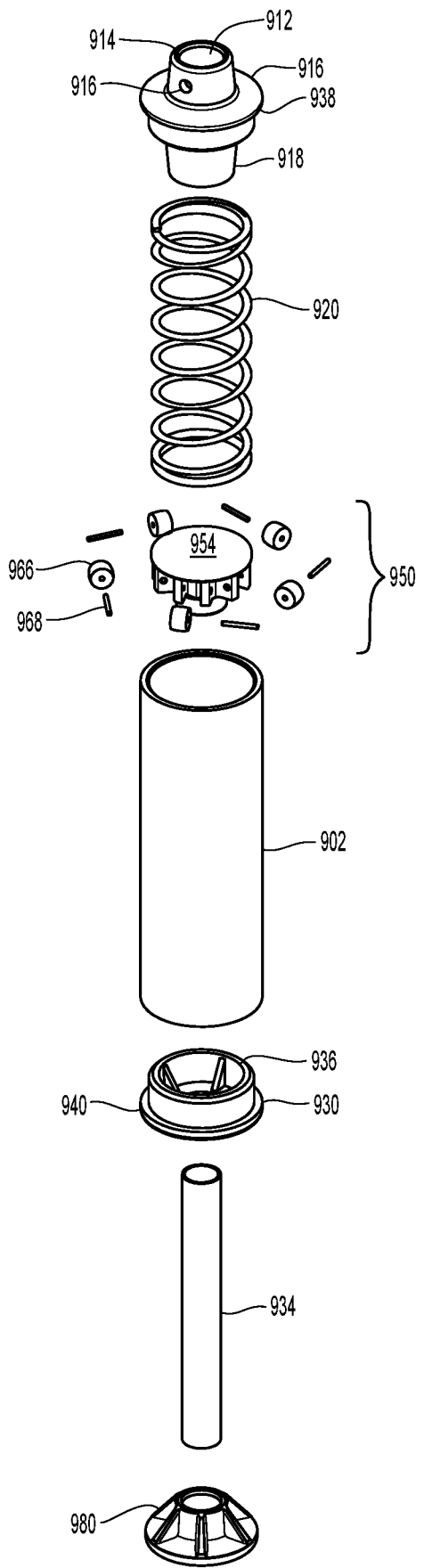
FIG. 19 is a perspective, exploded view of the rocking mechanism of FIG. 17.
Figure 20:
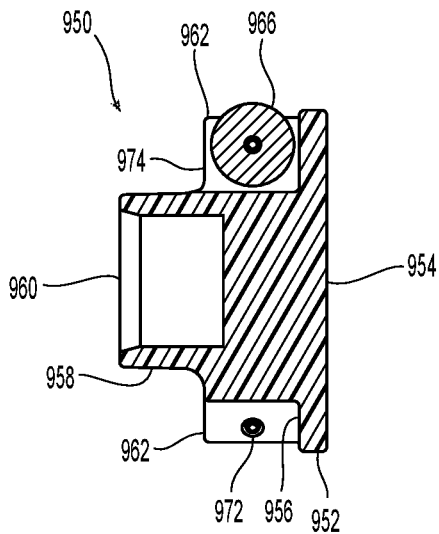
FIG. 20 is a cross section of one embodiment of a plunger according to the present invention in the rocking mechanism of FIG. 17.
Figure 21:
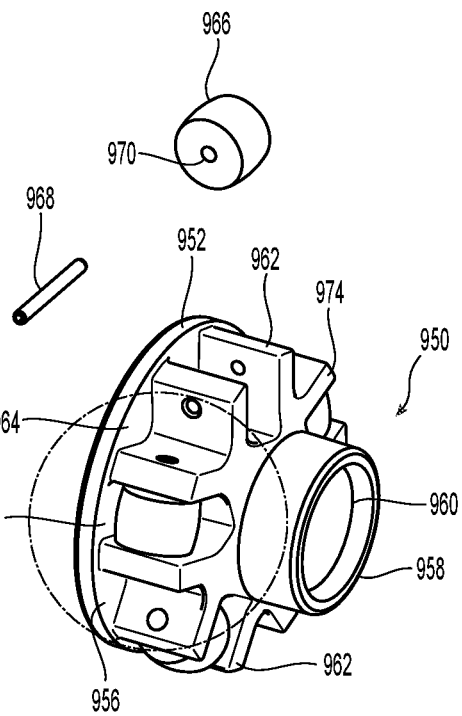
FIG. 21 is a perspective view of the plunger in FIG. 20.
Figure 22:
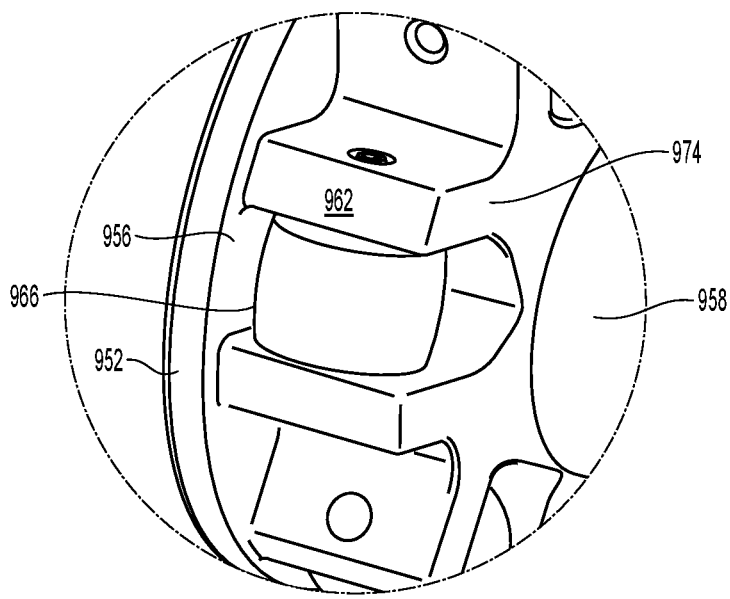
FIG. 22 is an enlarged view of the roller and pin in the plunger in FIG. 21.

The rocking mechanism 900 also includes a lower cap 930 fixedly attached to the tubular housing 902 at the lower end 908—in the same manner as noted above for the upper cap 910. The lower cap 930 has an opening 932 therethrough to receive a second leg portion 934 that extends into the interior portion 904 of the tubular housing 902. The lower cap 930 has an upwardly-directed flat surface 936, the purpose of which is described in more detail below. Both the upper cap 910 and the lower cap 930 preferably have a lip to engage the upper end 906 and the lower end 908, respectively. Referring to FIG. 18, the upper cap 910 has a lip 938 and the lower cap 930 has a lip 940, which assist in maintaining the relationship of the upper cap 910 and the lower cap 930 with the tubular housing 902.

The rocking mechanism 900 also includes a plunger 950 disposed within the interior portion 904 of the tubular housing 902. The plunger 950 includes a base 952 that has a first or upper flat surface 954. The first or upper flat surface 954 engages the spring 920. See FIG. 18. On the opposite or second side of the base 952 is a lower surface 956. Projecting outward from the lower surface 956 (and away from the upper flat surface 954) is a cylindrical extension 958. The cylindrical extension 958 has an opening 960 therein to receive the second leg portion 934. The second leg portion 934 may be secured in the opening 960 in any appropriate manner.

Extending radially outward from the cylindrical extension 958 is a plurality of tabs 962. The plurality of tabs 962 are spaced around the cylindrical extension 958 such that a plurality of spaces 964 are created with one space 964 being disposed between each of the plurality of tabs 962. Alternating spaces 964 are configured to receive a roller 966 therein. As illustrated, the plunger 950 has 5 rollers 966, but there could be more or fewer rollers 966 and still come within the scope of the present invention. A roller pin 968 is inserted through a hole 970 in the roller 966 and secured in holes 972 in each of the plurality of tabs 962. The rollers 966 extend beyond the edge of the base 952 so that the rollers can engage the inside surface of the tubular housing 902. See FIG. 20.

Each of the plurality of tabs 962 has a top surface 974. Preferably each of the top surfaces 974 is the same distance from the lower surface 956, providing a flat surface 974. As also visible in FIG. 20, the height of the top surface of the tabs 962 is higher than the diameters of the rollers 966. Thus, the top surface 974 provides an surface to engage the upwardly-directed flat surface 936 of the lower cap 930. See FIG. 18. It is also preferable that each of the plurality of tabs 962 also engages the lower surface 956 of the opposite or second side of the base 952.

In operation, the rocking mechanism 900 allows for a collapsible chair to become a rocking chair. Preferably, the rocking mechanism 900 is used on two of the back legs of the collapsible chair. The rocking mechanism 900 uses a portion of the legs of the collapsible chair and then the second leg portion 934, with a foot 980. When the chair user sits in the chair and begins to rock the second leg portion 934 and the plunger 950 are moved relative to the tubular housing 902. The spring 920 may only compress so far when the plunger 950 is moved toward the upper cap 910. On the return, the lower cap 930 prevents the plunger 950 from exiting the tubular housing 902 as the top surface 974 provides an surface to engage the upwardly-directed flat surface 936 of the lower cap 930. As can be seen in FIG. 18, the spring 920 is under a slight compression even with no weight applied—the spring is touching both the plunger 950 and the upper cap 910, thus requiring there to be some compression of the spring 920.

Figure 23:
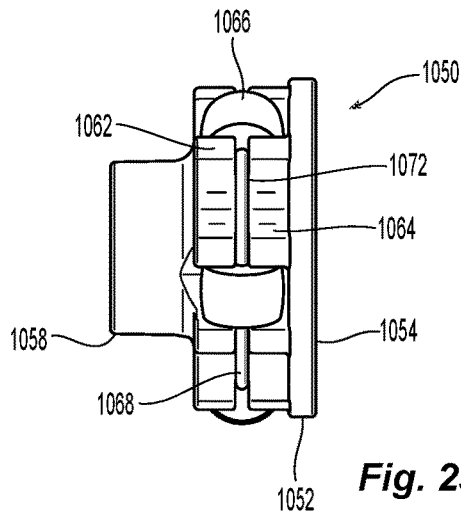
FIG. 23 is a side view of another embodiment of a plunger for a rocking mechanism according to the present invention.
Figure 24:
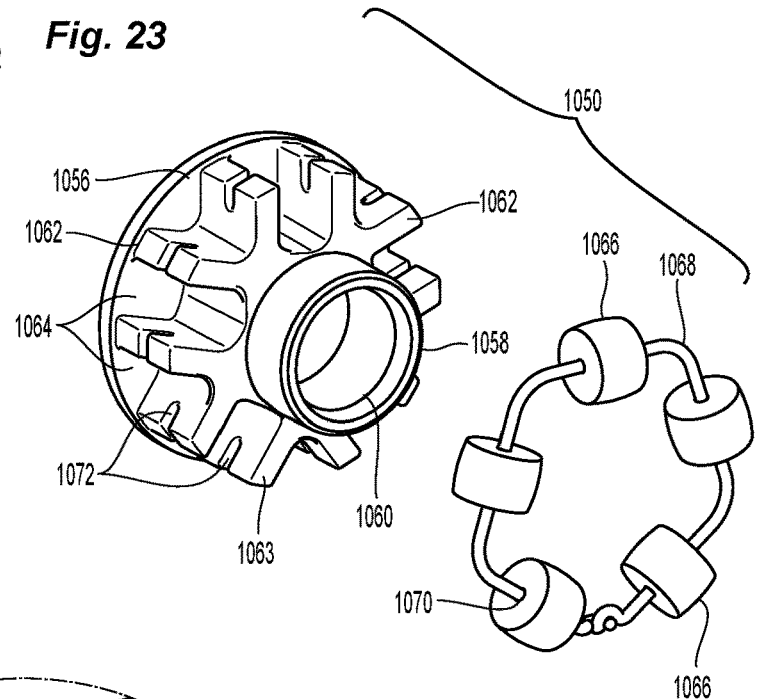
FIG. 24 is an exploded view of the plunger in FIG. 23.
Figure 25:
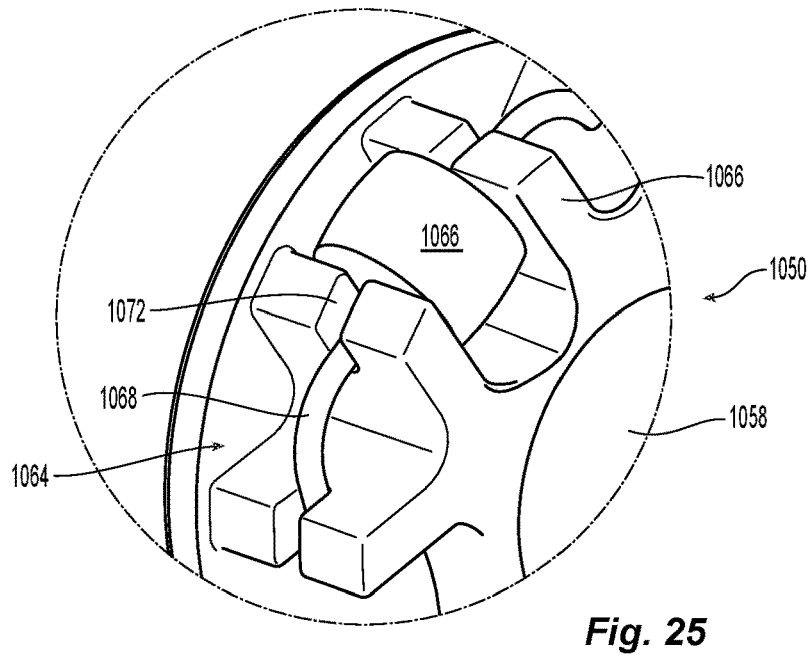
FIG. 25 is an enlarged view of the roller and pin in the plunger in FIG. 23.

An alternative version of a plunger 1050 according to the present invention is illustrated in FIGS. 23-25. The plunger plunger 1050 includes a base 1052 that has a first or upper flat surface 1054. The first or upper flat surface 1054 engages the spring 920 as in the previous embodiment. On the opposite or second side of the base 1052 is a lower surface 1056. Projecting outward from the lower surface 1056 is a cylindrical extension 1058. The cylindrical extension 1058 has an opening 1060 therein to receive the second leg portion (not shown). The second leg portion may be secured in the opening 1060 in any appropriate manner.

Extending radially outward from the cylindrical extension 1058 is a plurality of tabs 1062. The plurality of tabs 1062 are spaced around the cylindrical extension 1058 such that a plurality of spaces 1064 are created, one space 1064 is disposed between each of the plurality of tabs 1062. Alternating spaces 1064 are configured to receive a roller 1066 therein. As illustrated, the plunger 1050 also has 5 rollers 1066, but there could be more or fewer rollers 1066 and still come within the scope of the present invention. Rather than each of the rollers 1066 each having its own roller pin, all of the rollers 1066 are disposed on single wire 1068 using the holes 1070 in the rollers 1066. See FIG. 24. Additionally, each of the plurality of tabs 1062 have a slot 1072. The wire 1068 with the rollers 1066 is then inserted into the slots 1072 with the rollers 1066 disposed in the appropriate space 1064. Preferably the wire 1068 is formed in a generally round configuration (more of a pentagon than a true circle), but having a diameter that is smaller when not installed in the plunger 1050 than when it is. Thus, the wire 1068 is biased inwardly toward the cylindrical extension 1058 to retain the rollers in the plunger 1050. Additionally, the rollers 1066 extend beyond the edge of the base 1052 so that the rollers can engage the inside surface of the tubular housing.

Figure 26:
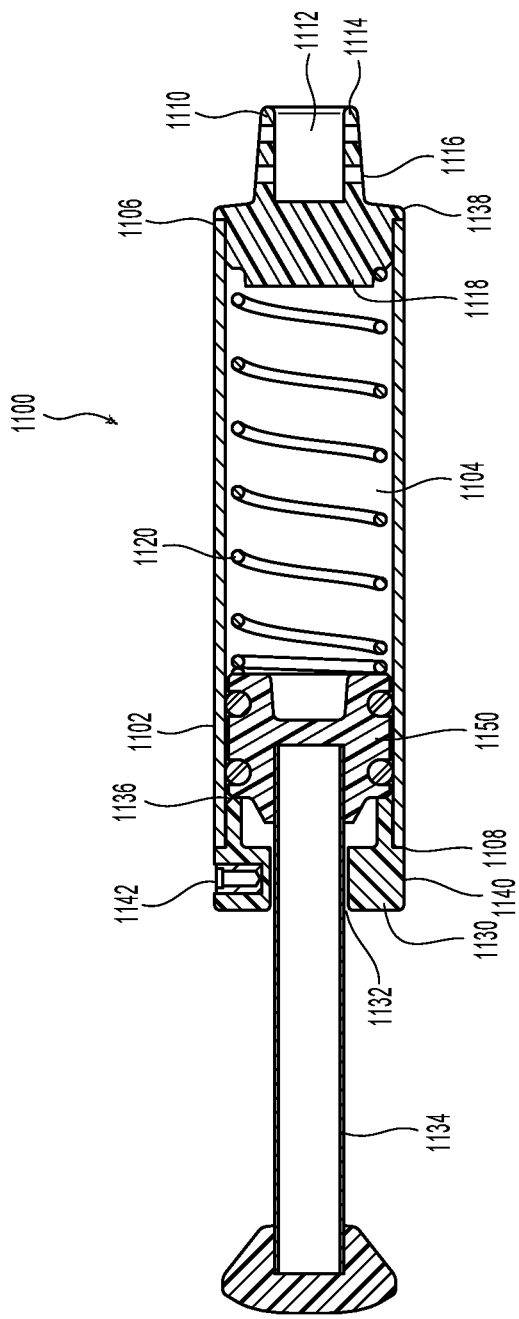
FIG. 26 is a cross section view of another embodiment of a rocking mechanism according to the present invention that includes another embodiment of a plunger according to the present invention.
Figure 29:
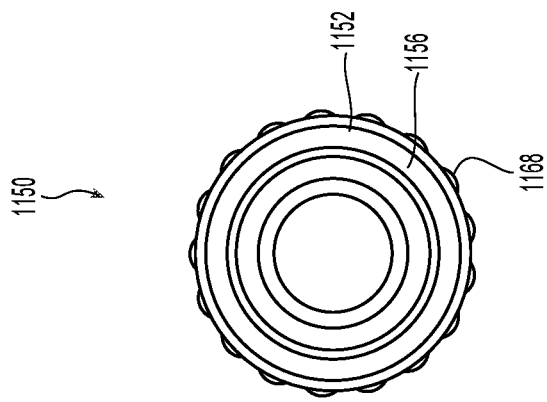
FIG. 29 is a bottom view of the plunger in FIG. 26.
Figure 28:
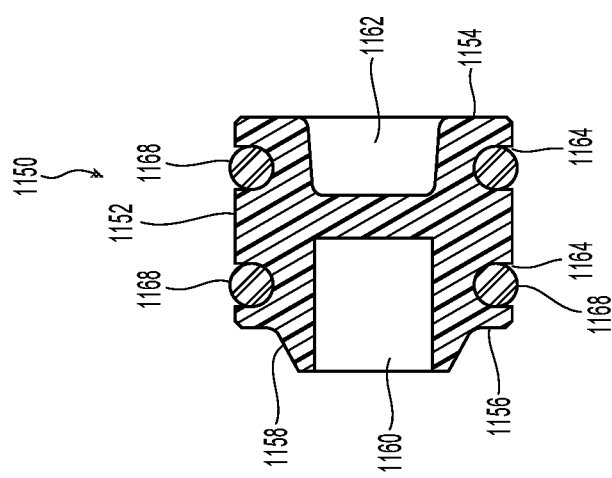
FIG. 28 is cross section view of the plunger in FIG. 26.
Figure 27:
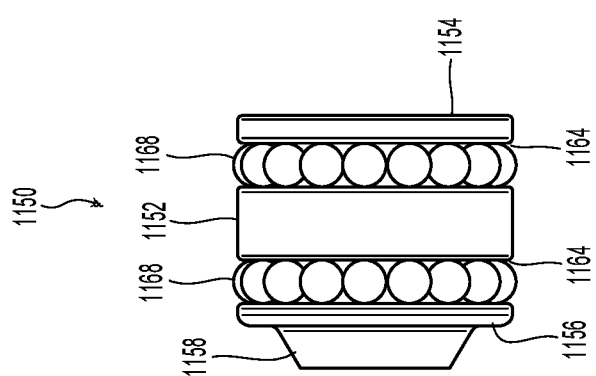
FIG. 27 is a side view of the plunger in FIG. 26.
Figure 30:
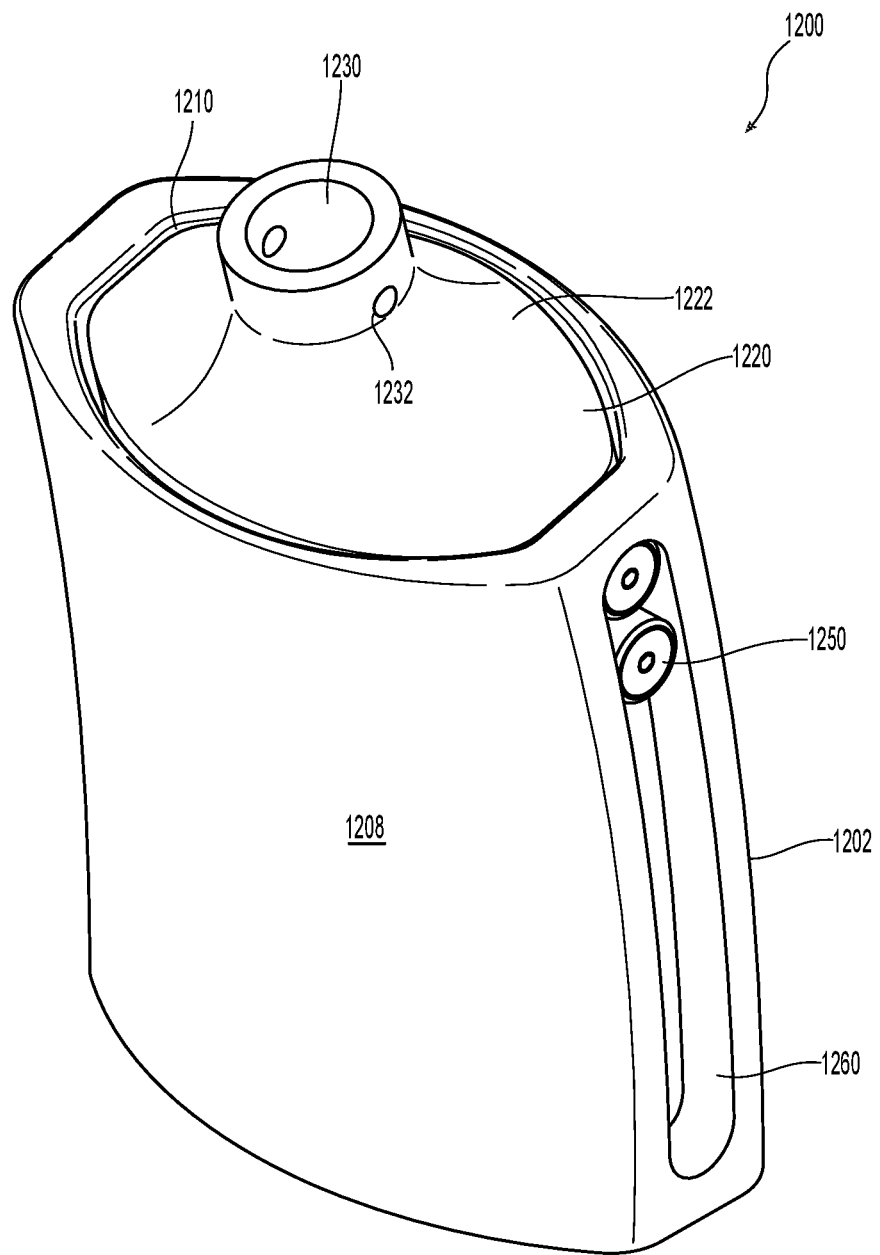
FIG. 30 is a perspective view of another embodiment of a rocking mechanism according to the present invention.
Figure 31:
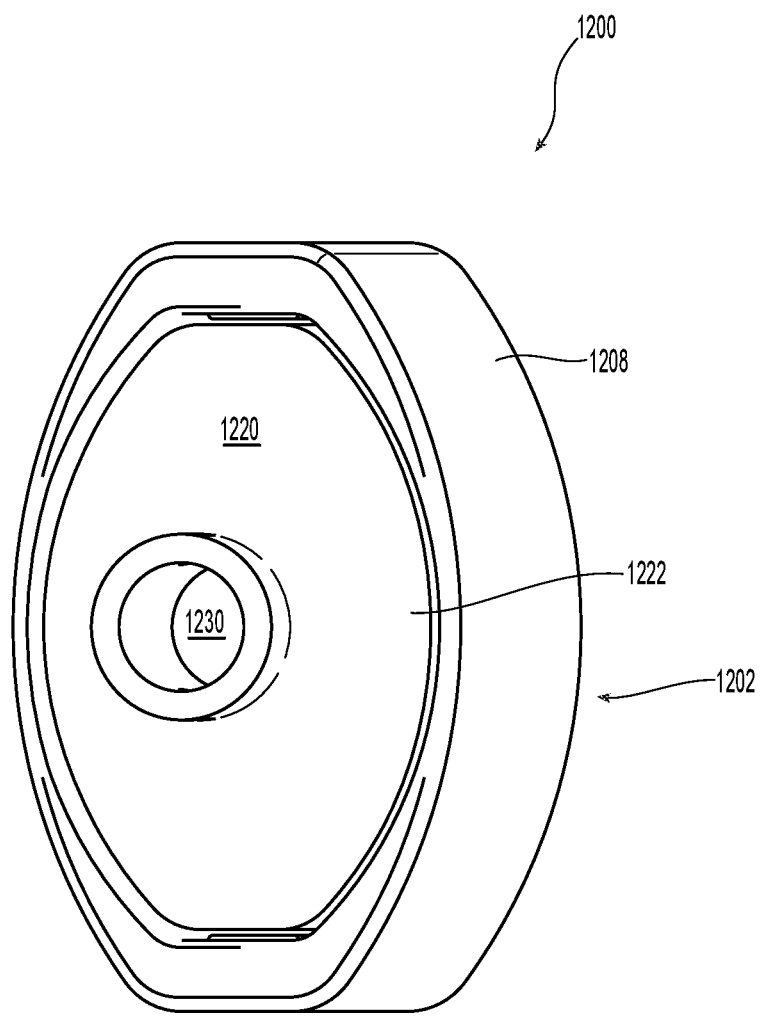
FIG. 31 is a top view of the rocking mechanism of FIG. 30.

Another embodiment of a rocking mechanism 1100 is illustrated in FIGS. 26-29. The rocking mechanism 1100 has a tubular housing 1102 that defines an interior portion 1104 extending between an upper end 1106 and a lower end 1108. There is an upper cap 1110 fixedly attached to the tubular housing 1102 at the upper end 1106, the upper cap 1110 is configured to engage the single chair leg (not shown). In one embodiment, the upper cap 1110 has a first opening 1112 in a top end 1114, the first opening 1112 configured to receive at least a portion of the chair leg of the collapsible chair. The upper cap 1110 may also have at least one second opening 1116 (two are illustrated in FIG. 26) configured to receive a securing member to engage and maintain the chair leg in the upper cap 1110 as with other embodiments. Alternatively, the chair leg can be secured into the opening 1112 by a press-fit, adhesives, welding, threaded-engagement, etc. The underside of the upper cap 1110 has a centrally located projection 1118 that extends into the interior portion 1104. The projection 1118 centers a spring 1120 within the interior portion 1104 in the tubular housing 1102.

The rocking mechanism 1100 also includes a lower cap 1130 fixedly attached to the tubular housing 1102 at the lower end 1108—in the same manner as noted above for the upper cap 1110. The lower cap 1130 has an opening 1132 therethrough to receive a second leg portion 1134 that extends into the interior portion 1104 of the tubular housing 1102. The lower cap 1130 has an upwardly-directed flat surface 1136, to engage the plunger. Both the upper cap 1110 and the lower cap 1130 preferably have a lip to engage the upper end 1106 and the lower end 1108. Referring to FIG. 26, the upper cap 1110 has a lip 1138 and the lower cap 1130 has a larger lip 1140, which assist in maintaining the relationship of the upper cap 1110 and the lower cap 1130 with the tubular housing 1102. The lower cap 1130 may also have a set screw 1142 that allows the rocking mechanism 1100 to be locked—if the set screw 1142 engages the second leg portion 1134, then the rocking mechanism 1100 can not rock.

The rocking mechanism 1100 also includes a plunger 1150 disposed within the interior portion 1104 of the tubular housing 1102. The plunger 1150 includes a base 1152 that has a first or upper flat surface 1154. The first or upper flat surface 1154 engages the spring 1120. The upper flat surface 1154 may also have an opening 1162 extending downward into the base 1152. See FIG. 28. On the opposite or second side of the base 1152 is a lower surface 1156. Projecting outward from the lower surface 1156 is a cylindrical extension 1158. The cylindrical extension 1158 has an opening 1160 therein to receive the second leg portion 1134. The second leg portion 1134 may be secured in the opening 1160 in any appropriate manner.

The rocking mechanism 1100 has at least one or more grooves 1164 that encircle or circumscribe the plunger 1150. The grooves 1164 may be broken into a number of smaller grooves, each of which do not completely encircle the base member 1152. Inserted into each of the grooves 1164 are a plurality of ball bearings 1168. The number of ball bearings in the grooves 1164 can differ, depending on the size of the ball bearings 1168. Preferably each of the ball bearings 1168 extend beyond the edge of the base 1152 so that the ball bearings 1168 can engage the inside surface of the tubular housing 1102. The ball bearings 1168 are also retained in the grooves 1164 by the inside surface of the tubular housing 1102. However, it is conceivable that the grooves 1164 could be configured to assist in retaining the ball bearings through a lip in the grooves 1164.

Figure 32:
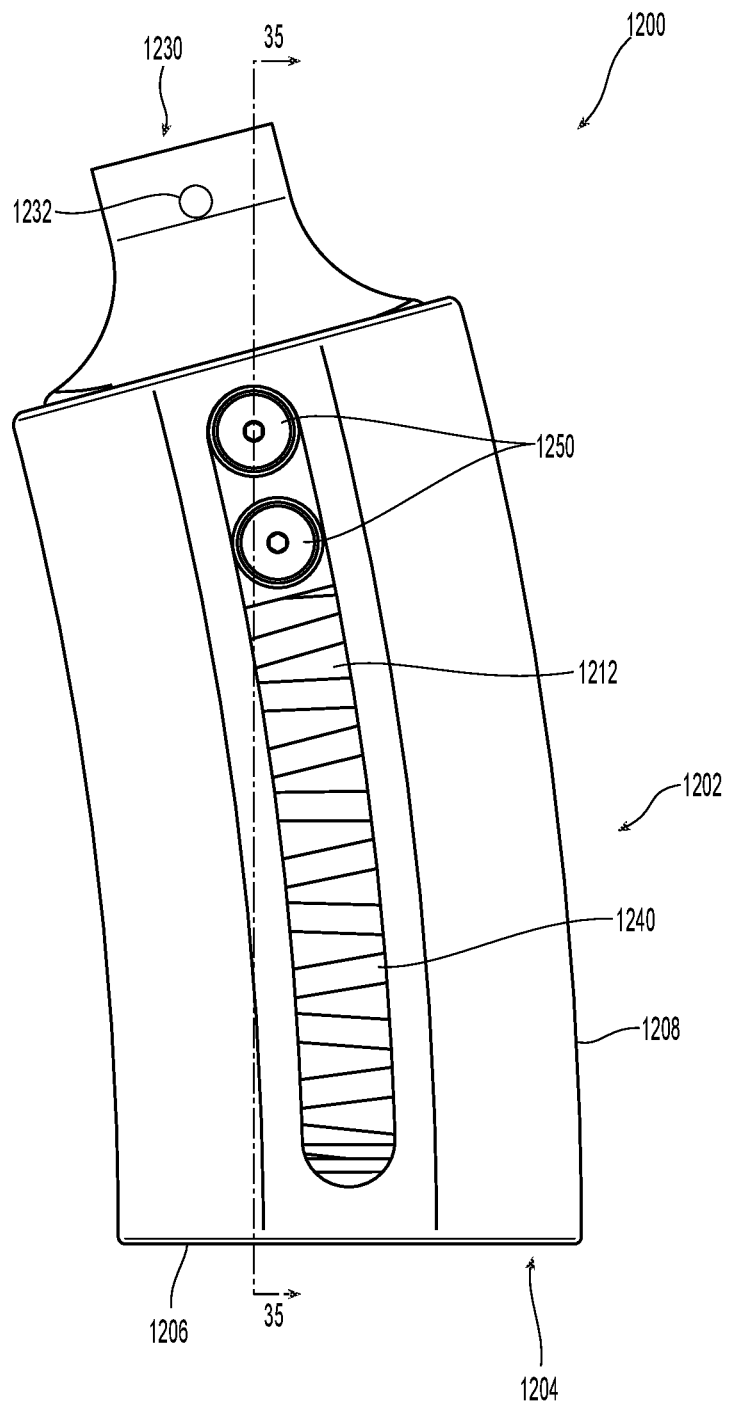
FIG. 32 is a side view of the rocking mechanism of FIG. 30.
Figure 33:
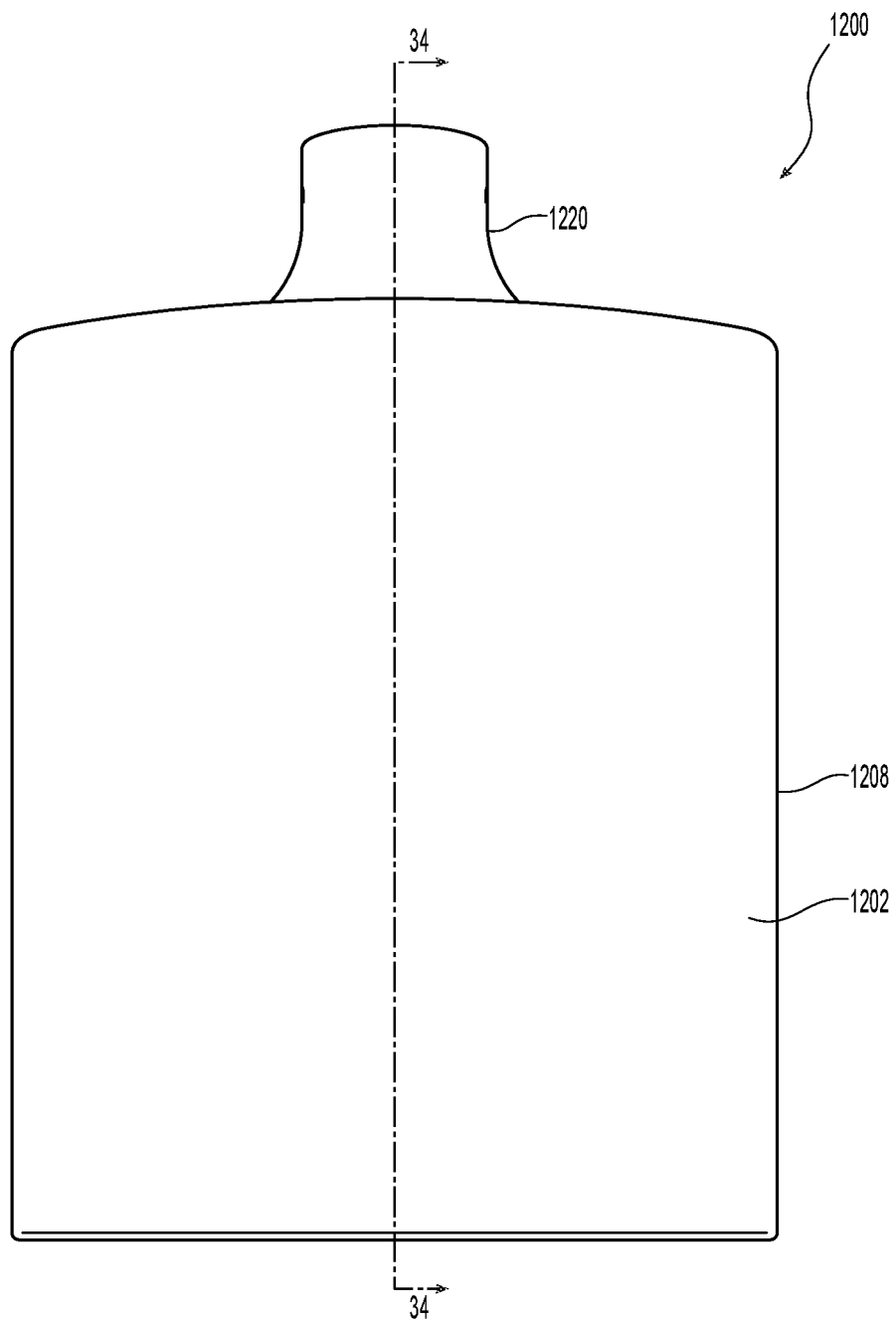
FIG. 33 is a rear side view of the rocking mechanism of FIG. 30.

Another embodiment of a rocking mechanism 1200 is illustrated in FIGS. 30-36. The rocking mechanism 1200 includes a foot portion 1202 that forms the base of the rocking mechanism 1200. The foot portion 1202 has a bottom 1204 that is preferably closed and an outside surface 1206 makes contact with the ground or other floor-type surface (not shown) on which the collapsible chair is placed. The outside surface 1206 may therefore have any number of surface treatments to assist in keeping the chair from any slippage on the surface if so desired. The foot portion 1202 also has side walls 1208 extending from the bottom 1204 to an open top 1210. As can be seen in the figures, and particularly in FIG. 34, the side walls 1208 and the bottom 1204 appear to be seamless in the figures—that is all one piece that is formed all at the same time without any subsequent connection of any individual parts. However, the foot portion 1202 may also be made from a plurality of individual side walls and a bottom portion that are connected and joined together to form the foot portion 1202. As best illustrated in FIG. 32, the rocking mechanism 1200 and, in particular, the foot portion 1202 are curved to allow for the rocking motion of a collapsible chair (not shown). The collapsible chair would have regular front legs, that would be pivot point for the rocking motion.

Figure 34:
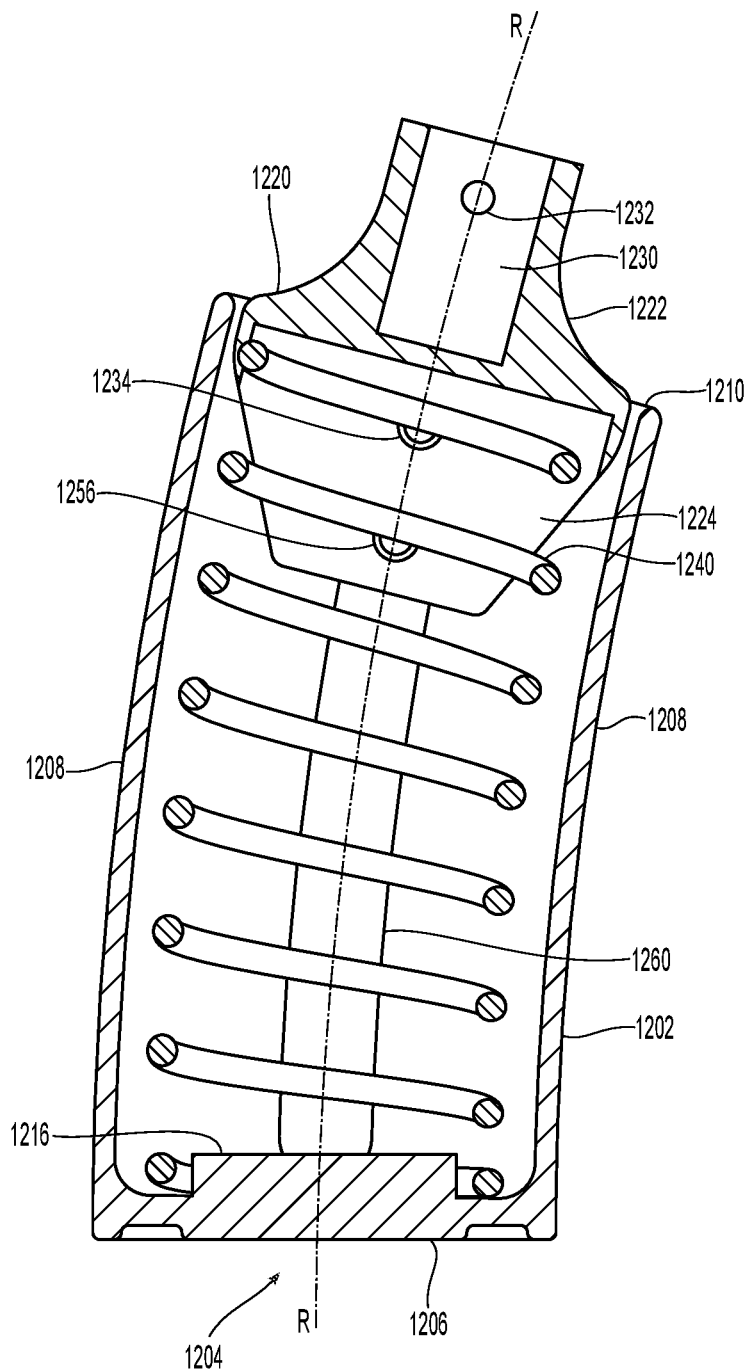
FIG. 34 is a cross-section view of the rocking mechanism of FIG. 30 along the lines illustrated in FIG. 33.

The foot portion 1202 also has an open top 1210 to allow for access into an internal cavity 1212 that is formed by the bottom 1204 and the side walls 1208 extending between the bottom 1204 and the open top 1210. The internal cavity 1212 has a curvature that corresponds to the curvature of the foot portion 1202 and is illustrated in FIG. 34 as having a radius R, which may be about 50 cm. Naturally, this radius could be different (either larger or smaller) depending on the size of the chair, length of the chair legs, etc. On the inside surface 1214 of the bottom 1204 of the foot portion 1202 is an elastic member extension 1216 that extends from the bottom 1204 upward into the internal cavity 1212, whose use is explained below.

The open top 1210 and internal cavity 1212 receive a leg receiving member 1220 therein. The leg receiving member 1220 has an upper side 1222 and a lower side 1224. Between the upper side 1222 and the lower side 1224, the leg receiving member 1220 has a middle portion 1226 with a circumference that is generally configured to be the same shape and size as the internal cavity 1212, allowing the leg receiving member 1220 to move within the internal cavity 1212. The thickness of the middle portion 1226 maybe thicker or thinner than that illustrated in the figures. The thickness (relative or absolute) may depend on the curvature of the foot portion 1202 (a smaller radius may require a thinner middle portion), the size of the chair legs, the material from which it is made, etc. The upper side 1222 of the leg receiving member 1220 slopes upward from the middle portion 1226 to a central conical area that forms an opening 1230 to receive a portion of a leg of a chair therein. The leg of the chair may be secured within the opening 1230 in any known manner. However, holes 1232 in the upper side 1222 of the leg receiving member 1220 adjacent to the opening 1230 provide a way to connect the leg receiving member 1220 to the portion of the leg by way of rivets, a pin, or any other acceptable method. Alternatively, the two pieces could be connected by ultrasonic welding, adhesives, or other mechanical means of connecting the two pieces to one another.

Figure 35:
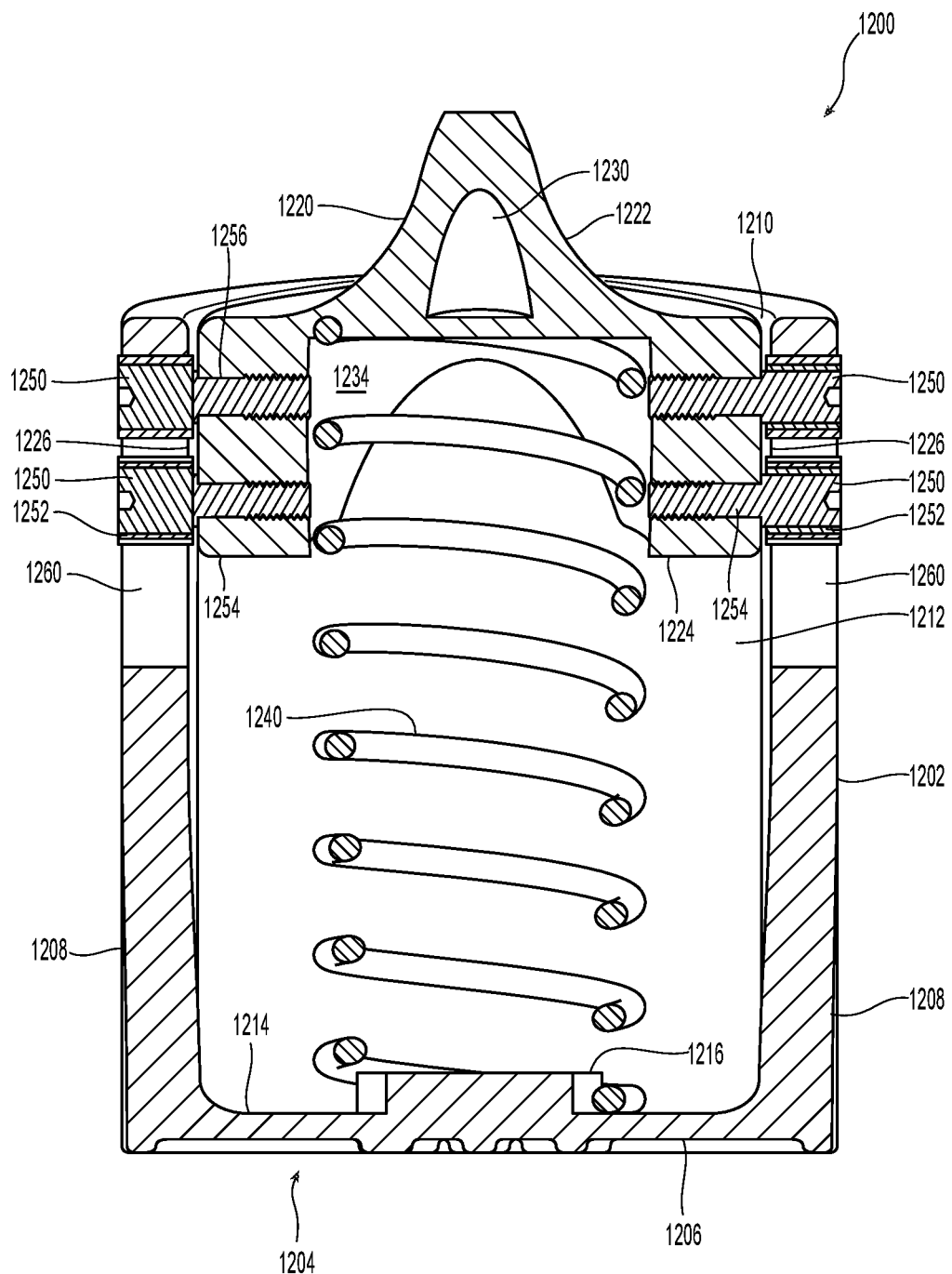
FIG. 35 is a cross-section view of the rocking mechanism of FIG. 30 along the lines illustrated in FIG. 32.
Figure 36:
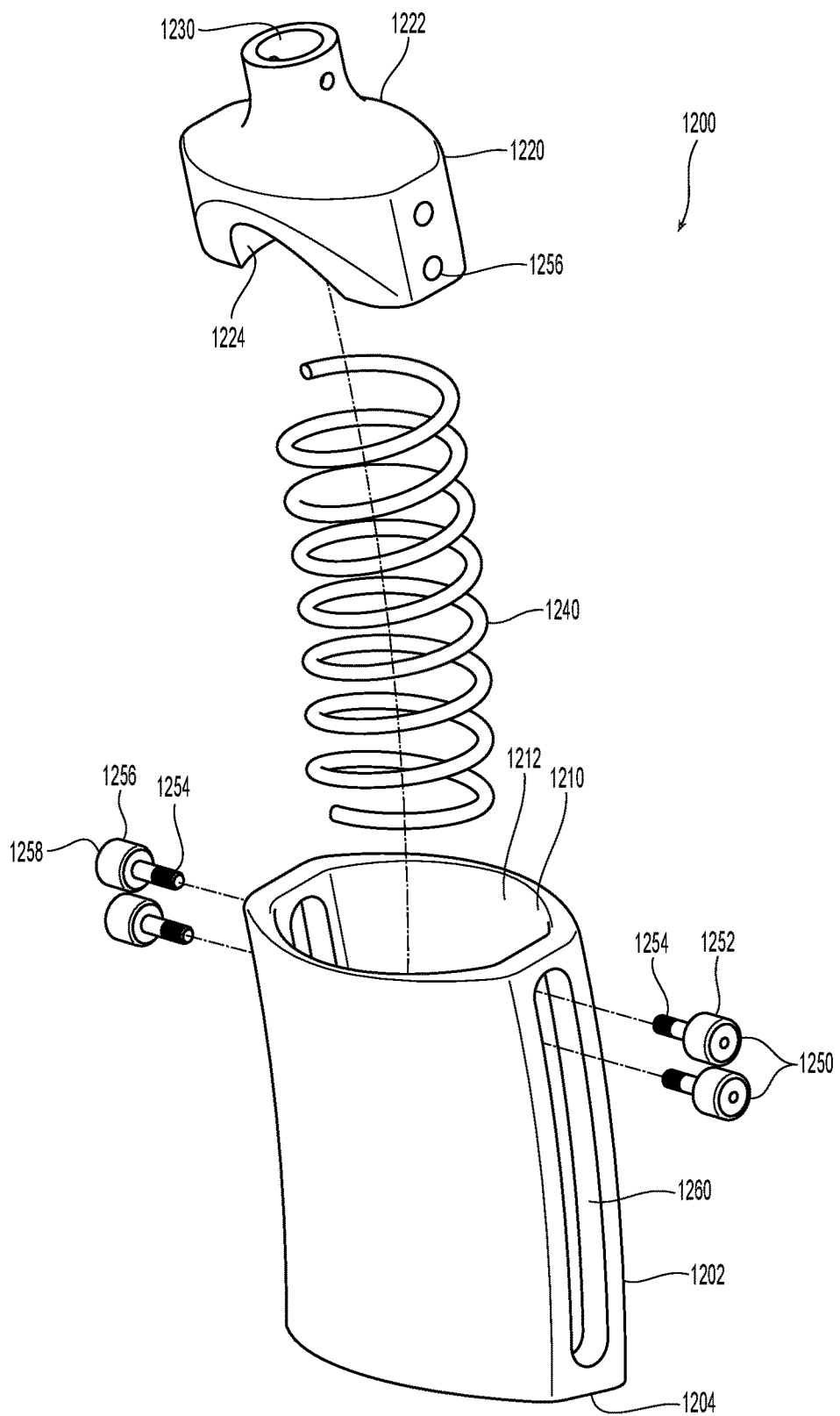
FIG. 36 is an exploded view of the rocking mechanism of FIG. 30.
Figure 37:
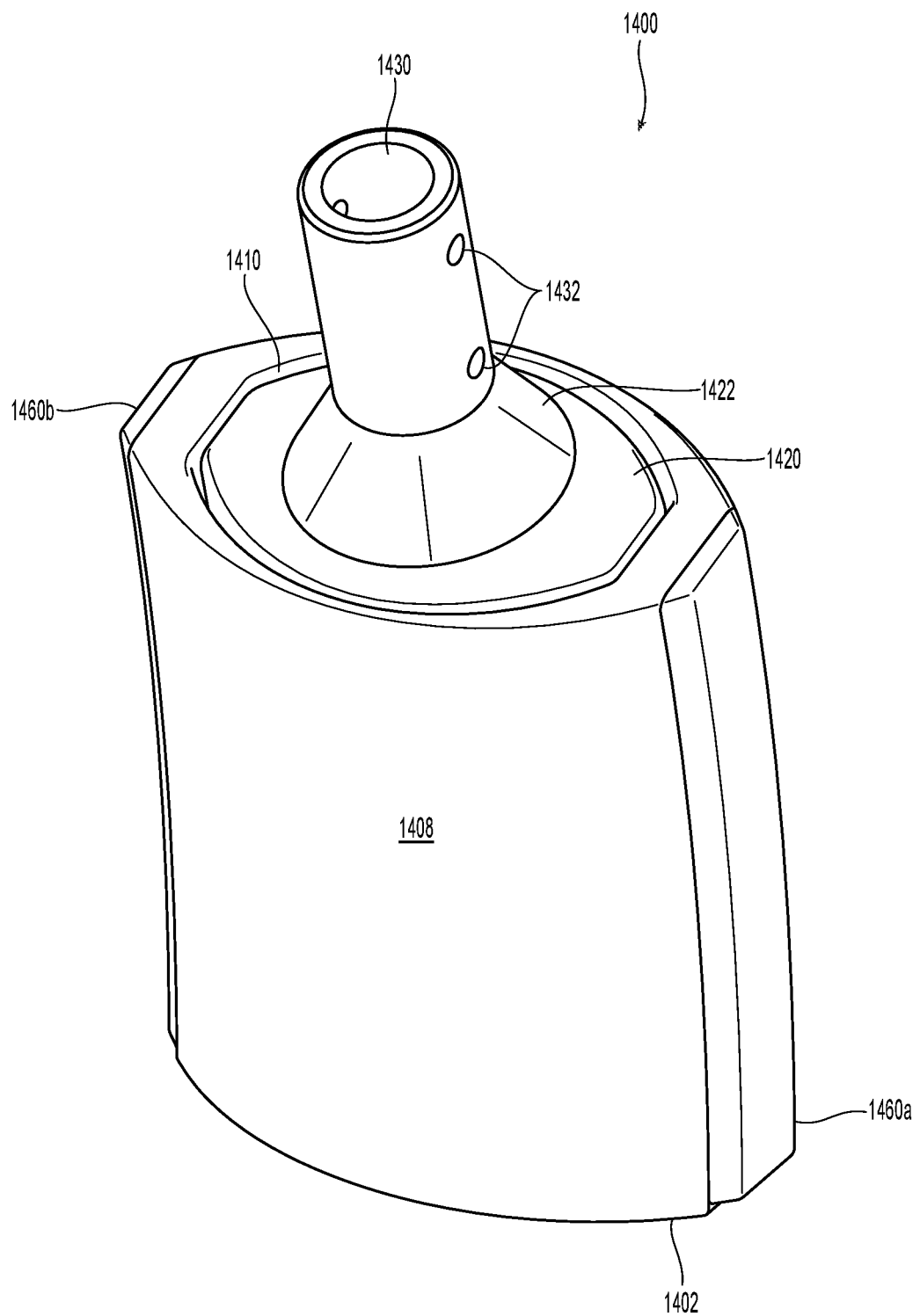
FIG. 37 is a perspective view of another embodiment of a rocking mechanism according to the present invention.
Figure 38:
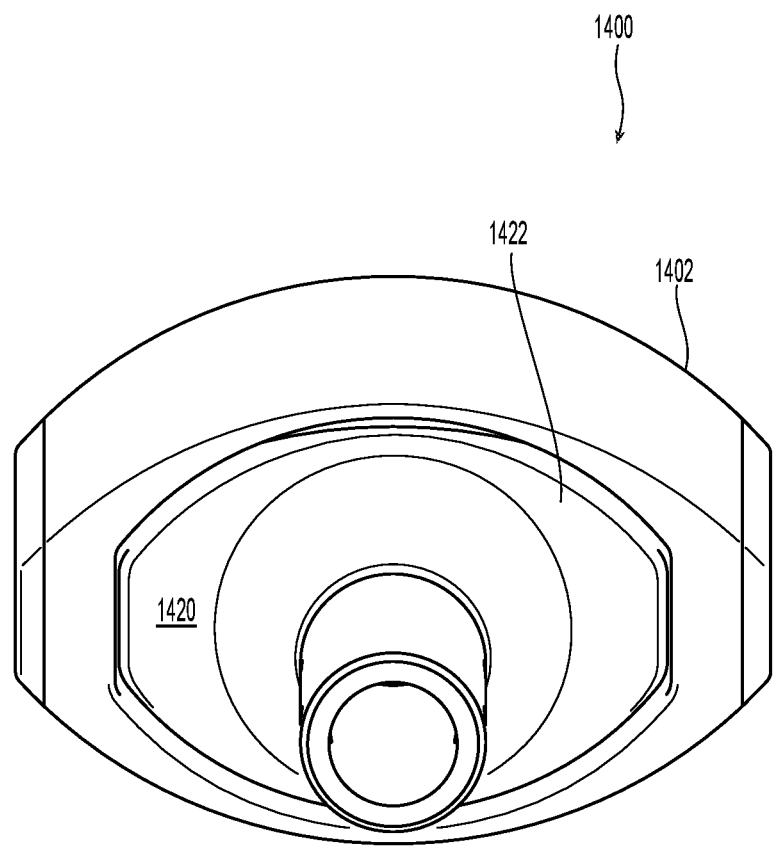
FIG. 38 is a top view of the rocking mechanism of FIG. 37.

The other side of the leg receiving member 1220 is the lower side 1224 and has a depression 1234 therein to receive and center a portion of an elastic member 1240 that is placed in the internal cavity 1212 between the inside surface 1214 of the bottom 1204 and the lower side 1224 of the leg receiving member 1220. The elastic member 1240 is illustrated as a coil spring 1240 that biases the leg receiving member 1220 toward the open top 1210 of the rocking mechanism 1200. Other types of resilient elements could be used in place of the coil spring, e.g., a urethane spring. FIG. 35 illustrates that the elastic member extension 1216 is disposed inside the coil spring 1240 to keep the end of the coil spring 1240 from moving around within the internal cavity 1212 during operation of the rocking mechanism 1200. It should be noted that the elastic member 1240 it's preferably under at least some compression (i.e., preloaded) when the leg receiving number 1220 is as high (towards the open top 1210) in the foot portion 1202 and when there is no force in a downward direction (toward the bottom 1204). The amount of compression can vary by the size, length, and/or compression coefficient of the elastic member 1240.

The leg receiving member 1220 also has at least one guiding member 1250 extending from opposing sides of the middle portion 1226 of the leg receiving member 1220. As illustrated, there are preferably two of the guiding members 1250 extending from opposing sides of the middle portion 1226 of the leg receiving member 1220 for a total of four guiding members 1250. These guiding members 1250 preferably have a head portion 1252 and a threaded portion 1254 to allow for them to be securely inserted into corresponding threaded openings 1256 in the leg receiving member 1220. The head portion 1252 extends outwardly away from and beyond the leg receiving member 1220 and into an elongated opening 1260 in the side walls 1208. Preferably, there is an elongated opening 1260 on each side of the foot portion 1202, but there may also be only one opening on one side. Additionally, the two guiding members 1250 could also be side-by-side and there be two of the elongated openings on each side of the foot portion 1202. The elongated opening 1260 extends from adjacent the bottom 1204 upwards toward the open top 1210. As seen in FIG. 32, the elongated opening 1260 has curvature that corresponds to the curvature of the internal opening 1210 and has the same curvature—radius R. The guiding members 1250 keep the leg receiving member 1220 moving along the curvature and prevents the leg receiving member 1220 from being pushed out of the open top 1210. While the guiding members 1250 do not rotate relative to the foot portion 1202 or the leg receiving member 1220, they could have a bushing or other configuration that allows a portion of the guiding members 1250 to rotate relative to the foot portion 1202 or the leg receiving member 1220.

In order to assemble the rocking mechanism 1200, the foot portion 1202 has an elastic member 1240 that is placed into the internal cavity 1212 and around the elastic member extension 1216. The leg receiving member 1220 is inserted into the open top 1210 and pushed downward so that the threaded openings 1256 in the leg receiving member 1220 are aligned with the elongated openings 1260, where the guiding members 1250 can be inserted into the leg receiving member 1220. The leg of the collapsible chair is attached to the rocking mechanism 1200.

Figure 39:
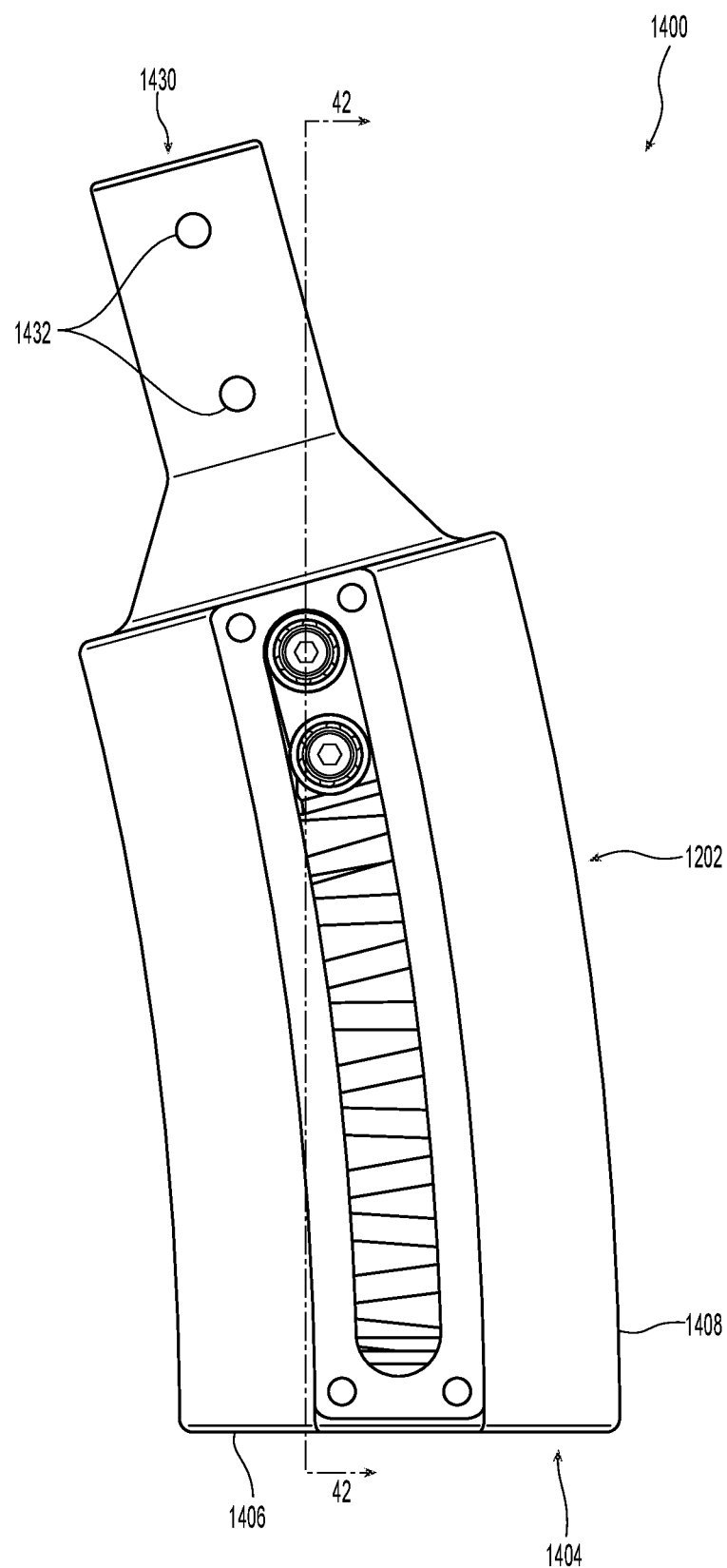
FIG. 39 is a side view of the rocking mechanism of FIG. 37.
Figure 40:
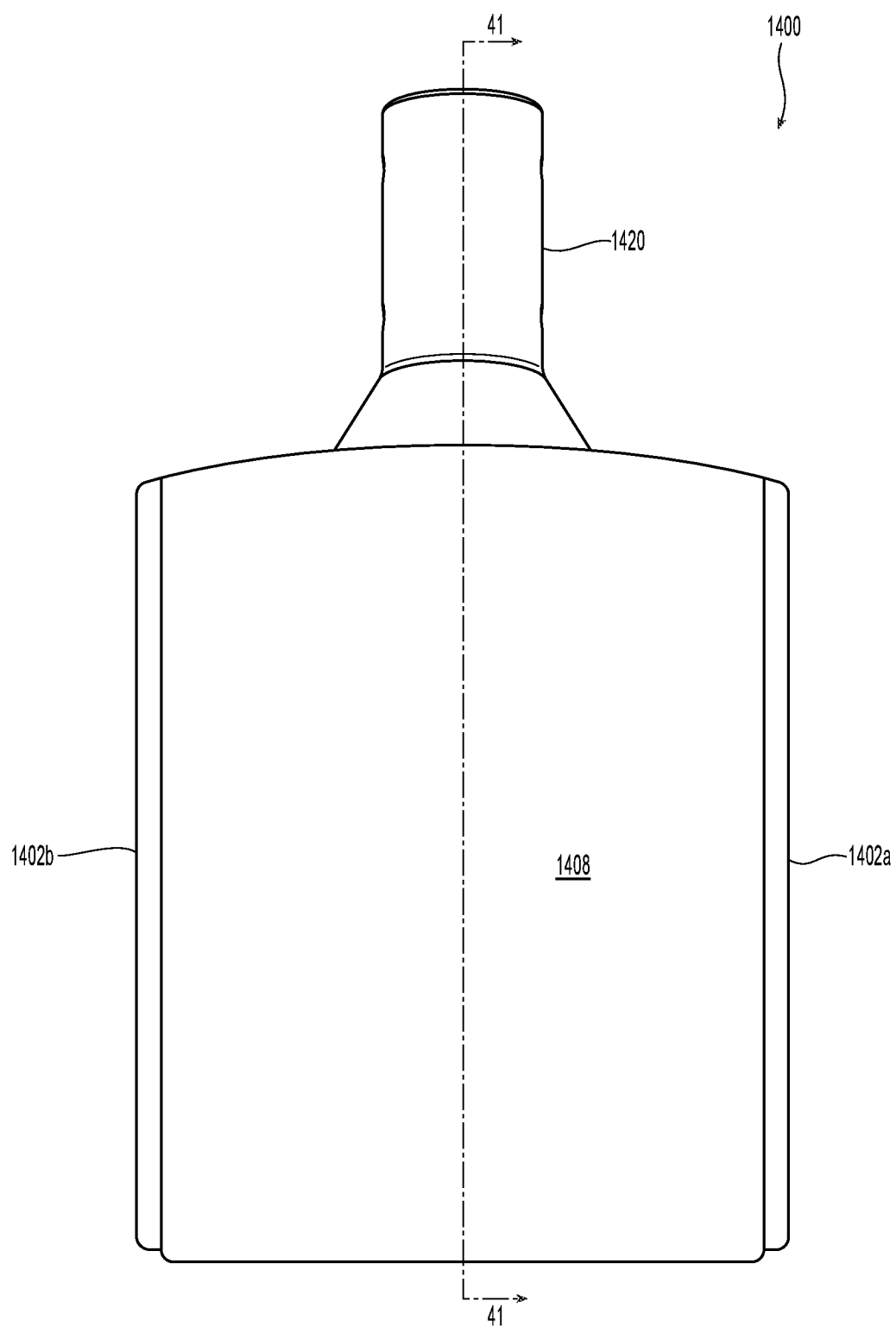
FIG. 40 is a rear side view of the rocking mechanism of FIG. 37.

Another embodiment of a rocking mechanism 1400 is illustrated in FIGS. 37-43. The rocking mechanism 1400 includes a foot portion 1402 that forms the base of the rocking mechanism 1400. See FIG. 43. The foot portion 1402 has a bottom 1404 that is preferably closed and an outside surface 1406 makes contact with the ground or other floor-type surface (not shown) on which the collapsible chair is placed. The outside surface 1406 may therefore have any number of surface treatments to assist in keeping the chair from any slippage on the surface if so desired. The foot portion 1402 also has side walls 1408 extending from the bottom 1404 to an open top 1410. As can be seen in the figures, and particularly in FIGS. 41-42, the side walls 1408 and the bottom 1404 appear to be seamless in the figures—that is all one piece that is formed all at the same time without any subsequent connection of any individual parts. However, the foot portion 1402 may also be made from a plurality of individual side walls and a bottom portion that are connected and joined together to form the foot portion 1402. As best illustrated in FIG. 39, the rocking mechanism 1400 and, in particular, the foot portion 1402 are curved to allow for the rocking motion of a collapsible chair (not shown). The collapsible chair would have regular front legs, that would act as the pivot point for the rocking motion.

Figure 41:
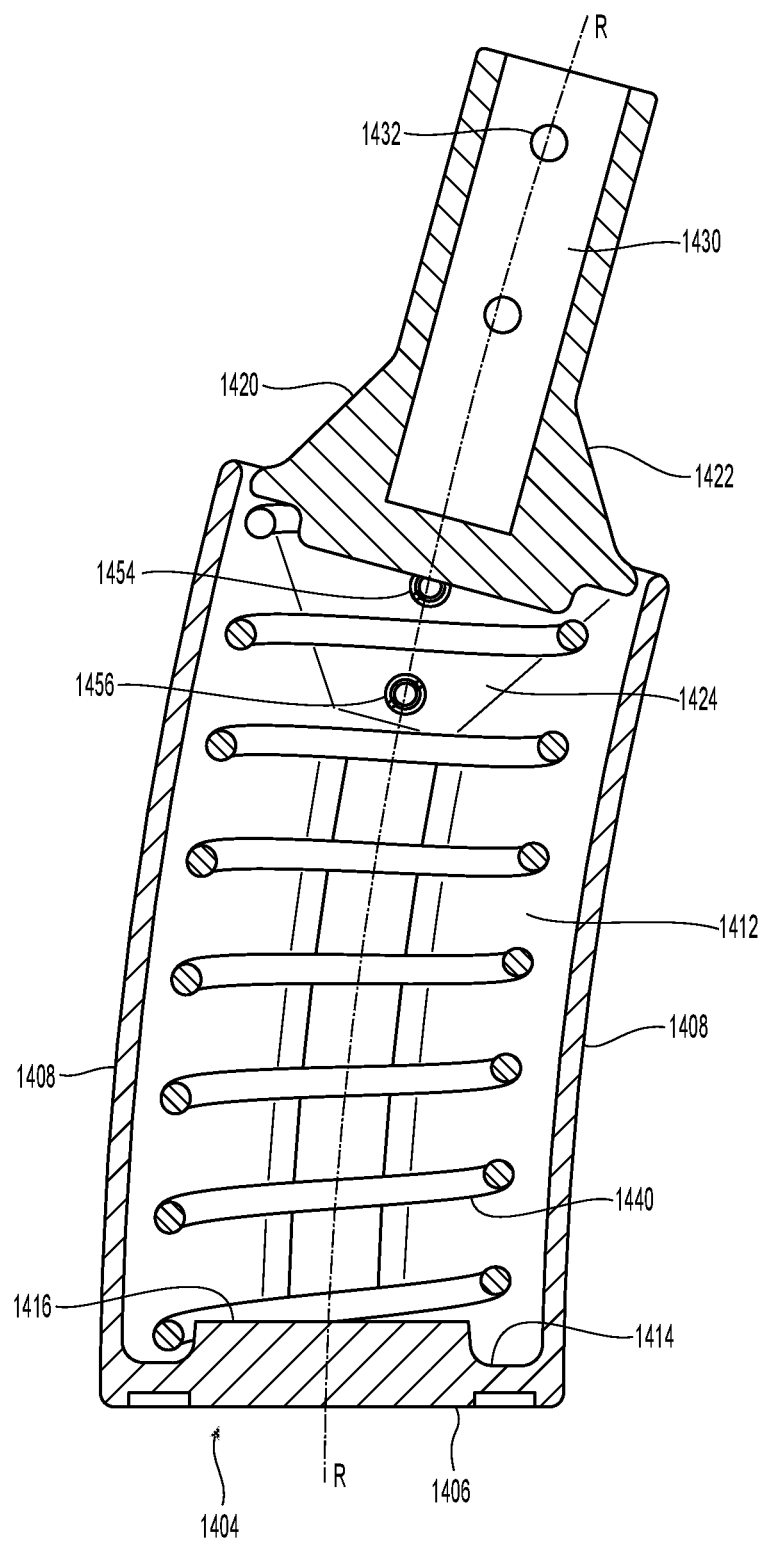
FIG. 41 is a cross-section view of the rocking mechanism of FIG. 37 along the lines illustrated in FIG. 40.

The foot portion 1402 also has an open top 1410 to allow for access into an internal cavity 1412 that is formed by the bottom 1404 and the side walls 1408 extending between the bottom 1404 and the open top 1410. The internal cavity 1412 has a curvature that corresponds to the curvature of the foot portion 1402 and is illustrated in FIG. 41 as having a radius R, which may be about 50 cm. Naturally, this radius could be different (either larger or smaller) depending on the size of the chair, length of the chair legs, etc. On the inside surface 1414 of the bottom 1404 of the foot portion 1402 is an elastic member extension 1416 that extends from the bottom 1404 upward into the internal cavity 1412 and whose use is explained below.

The open top 1410 and internal cavity 1412 receive a leg receiving member 1420 therein. The leg receiving member 1420 has an upper side 1422 and a lower side 1424. Between the upper side 1422 and the lower side 1424, the leg receiving member 1420 has a middle portion 1426 with a circumference that is generally configured to be the same shape and size as the internal cavity 1412, allowing the leg receiving member 1420 to move within the internal cavity 1412. The thickness of the middle portion 1426 maybe thicker or thinner than that illustrated in the figures. The thickness (relative or absolute) may depend on the curvature of the foot portion 1402 (a smaller radius may require a thinner middle portion), the size of the chair legs, the material from which it is made, etc. The upper side 1422 of the leg receiving member 1420 slopes upward from the middle portion 1426 to a central conical area that forms an opening 1430 to receive a portion of a leg of a chair therein. The leg of the chair may be secured within the opening 1430 in any known manner. However, holes 1432 in the upper side 1422 of the leg receiving member 1420 adjacent to the opening 1430 provide a way to connect the leg receiving member 1420 to the portion of the leg by way of rivets, a pin, or any other acceptable method. Alternatively, the two pieces could be connected by ultrasonic welding, adhesives, or other mechanical means of connecting the two pieces to one another.

Figure 42:
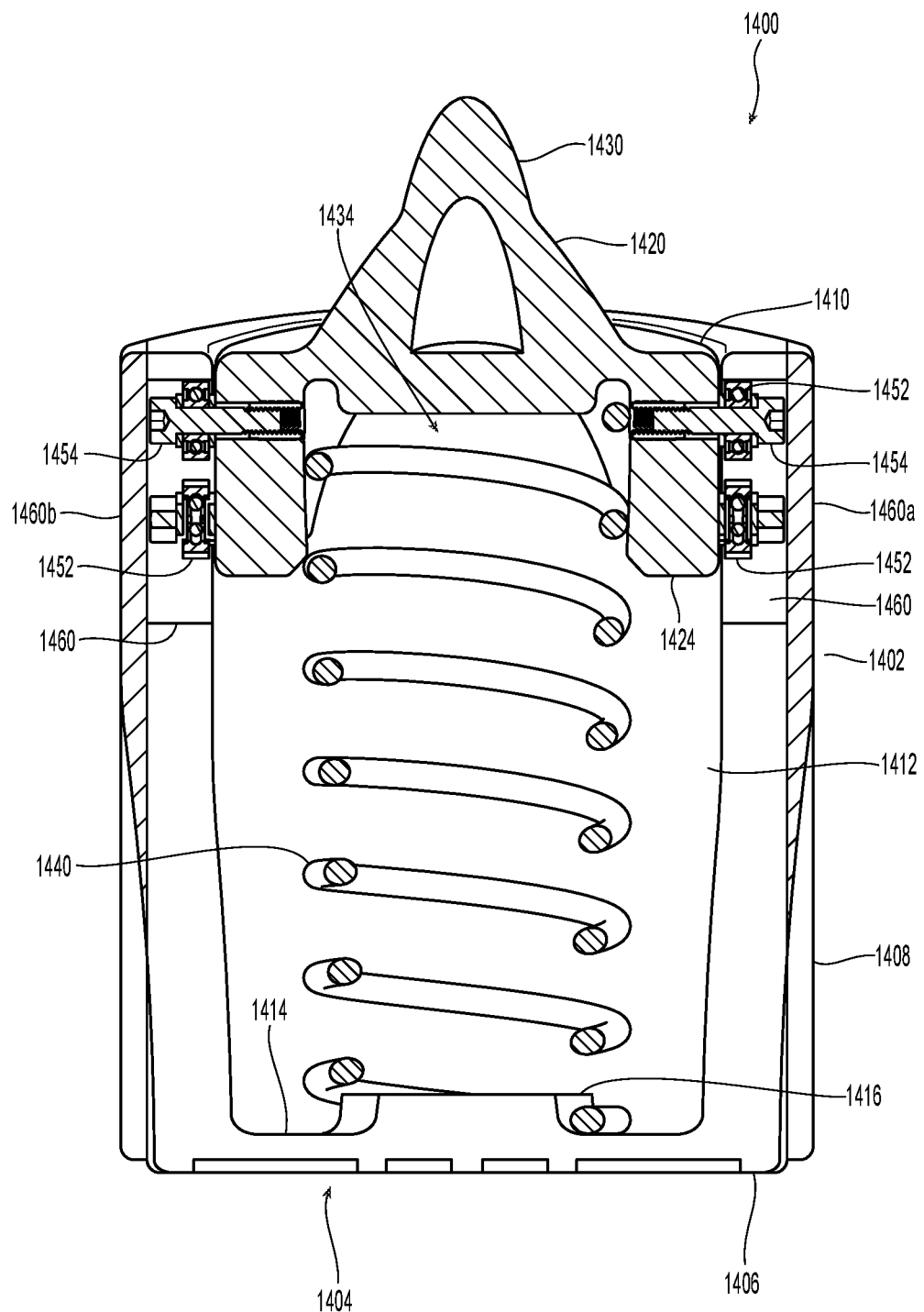
FIG. 42 is a cross-section view of the rocking mechanism of FIG. 37 along the lines illustrated in FIG. 39.

The other side of the leg receiving member 1420 is the lower side 1424 and has a depression 1434 therein to receive and center a portion of an elastic member 1440 that is placed in the internal cavity 1412 between the inside surface 1414 of the bottom 1404 and the lower side 1424 of the leg receiving member 1420. The elastic member 1440 is illustrated as a coil spring 1440 that biases the leg receiving member 1420 toward the open top 1410 of the rocking mechanism 1400. Other types of resilient elements could be used in place of the coil spring, e.g., a urethane spring. FIG. 42 illustrates that the elastic member extension 1416 is disposed inside the coil spring 1440 to keep the end of the coil spring 1440 from moving around within the internal cavity 1412 during operation of the rocking mechanism 1400. It should be noted that the elastic member 1440 is preferably under at least some compression (i.e., preloaded) when the leg receiving number 1420 is as high (towards the open top 1410) in the foot portion 1402 and when there is no force in a downward direction (toward the bottom 1404). The amount of compression can vary by the size, length, and/or compression coefficient of the elastic member 1440.

Figure 43:
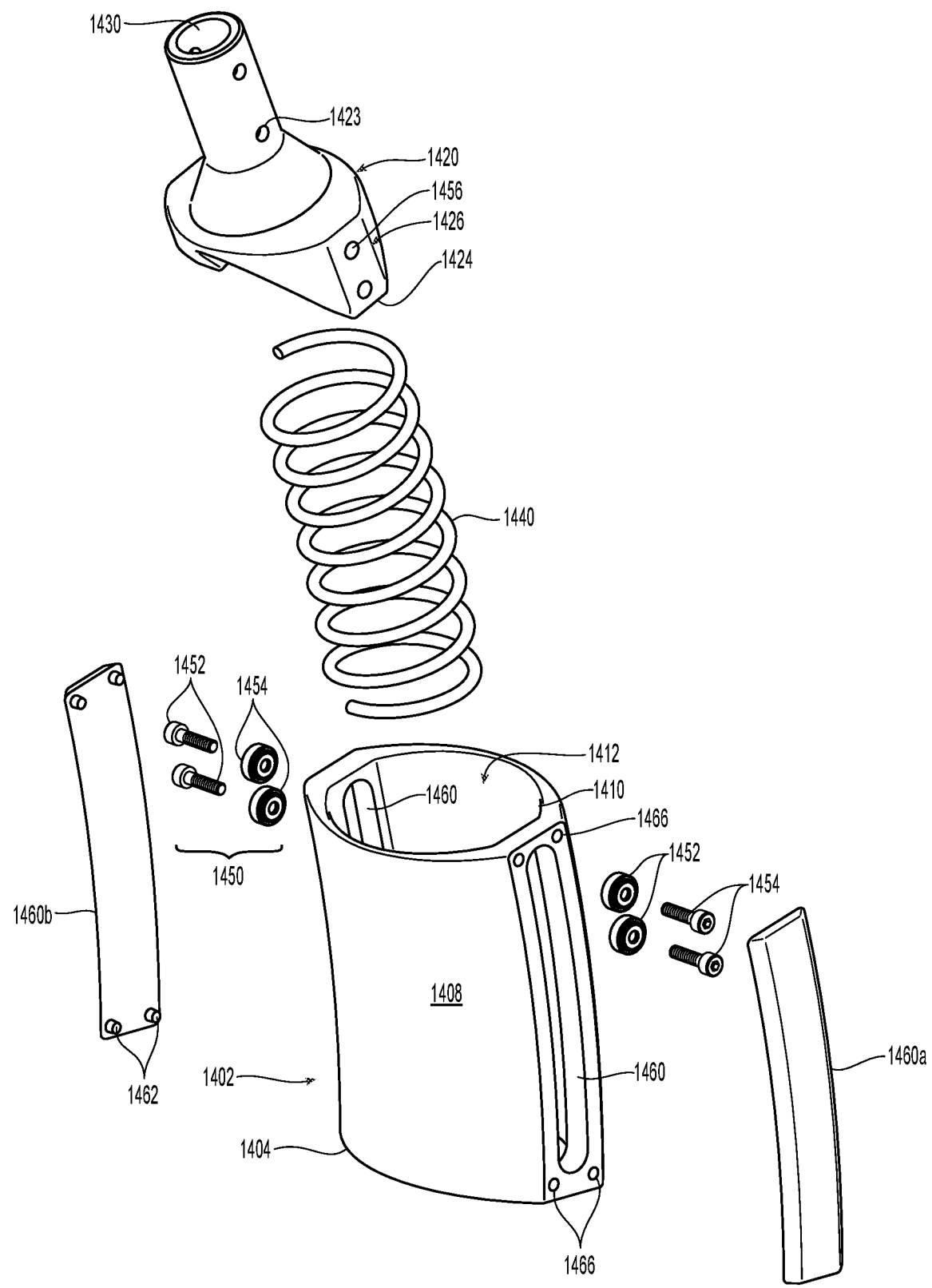
FIG. 43 is an exploded view of the rocking mechanism of FIG. 37.

Referring to FIGS. 42 and 43, the leg receiving member 1420 also has at least one guiding member 1450 extending from opposing sides of the middle portion 1426 of the leg receiving member 1420. As illustrated, there are preferably two of the guiding members 1450 extending from opposing sides of the middle portion 1426 of the leg receiving member 1420 for a total of four guiding members 1450. These guiding members 1450 preferably have a roller portion 1452 and a threaded portion 1454 to allow the guiding members 1450 to be securely inserted into corresponding threaded openings 1456 in the leg receiving member 1420. The threaded portion may also come from a brass insert that is either press-fit into the opening in the leg receiving member 1420 or insert molded in the leg receiving member 1420. The guiding members 1450 extend outwardly away from and beyond the leg receiving member 1420 and into an elongated opening 1460 in the side walls 1408. As noted in FIG. 42, the outside edge of the threaded portion 1454 does not extend beyond the edge of the elongated opening 1460. The roller portion 1452 may loosely fit around the threaded portion 1542 or be a two piece roller that has ball bearings between the two pieces as illustrated in FIG. 42.

Preferably, there is an elongated opening 1460 on each side of the foot portion 1402, but there may also be only one opening on one side. The elongated openings 1460 preferably have covers 1460*a* and 1460*b*, but they may also remain open. The covers 1460*a*/1460*b* are added to keep debris and other unwanted material out of the internal cavity 1412. The covers 1460*a*/1460*b* are preferably shaped to be streamlined with the rest of the foot portion 1402. The covers 1460*a*/1460*b* are removably attached. As illustrated in FIG. 43, the covers 1460*a*/1460*b* have tabs 1462 and the foot portion 1402 has openings 1466, the tabs frictionally engaging the foot portion 1402 around the openings 1466. Other methods of securing the covers 1460*a*/1460*b* are also within the scope of the present invention.

Additionally, the two guiding members 1450 could also be side-by-side and there be two of the elongated openings on each side of the foot portion 1402. The elongated opening 1460 extends from adjacent the bottom 1404 upwards toward the open top 1410. As seen in FIG. 41, the elongated opening 1460 has curvature that corresponds to the curvature of the internal opening 1410 and has the same curvature—radius R. The guiding members 1450 keep the leg receiving member 1420 moving along the curvature and prevents the leg receiving member 1420 from being pushed out of the open top 1410.

In order to assemble the rocking mechanism 1400, the foot portion 1402 has an elastic member 1440 that is placed into the internal cavity 1412 and around the elastic member extension 1416. The leg receiving member 1420 is inserted into the open top 1410 and pushed downward so that the threaded openings 1456 in the leg receiving member 1420 are aligned with the elongated openings 1460, where the guiding members 1450 can be inserted into the leg receiving member 1420. The leg of the collapsible chair is attached to the rocking mechanism 1400.

It will be apparent to those skilled in the art that various modifications and variations can be made to the present invention without departing from the spirit and scope of the invention. Thus it is intended that the present invention cover the modifications and variations of this invention provided they come within the scope of the appended claims and their equivalents.

I claim:

1. A rocking mechanism for a leg of a collapsible chair comprising:
   a foot portion having a bottom and an open top, side walls extending between the bottom and the open top creating an internal cavity;
   a leg receiving member disposed within the internal cavity and being configured to accept a portion of the leg of the collapsible chair, the leg receiving member having opposing sides;
   two elongated openings in the side walls extending therethrough, the two elongated openings on opposite sides of the foot portion and extending at least a portion of a distance between the bottom and the open top;
   at least one guiding member extending from each of the opposing sides of the leg receiving member and into a respective one of the two elongated openings in the side walls; and
   an elastic member disposed in the internal cavity between the leg receiving member and the bottom of the foot portion and wherein the elastic member passes between the at least one guiding member extending from each of the opposing sides.

2. The rocking mechanism according to claim 1, wherein the two elongated openings extend along at least 75% of the side wall between the bottom and the open top.

3. The rocking mechanism according to claim 1, wherein the at least one guiding member comprises at least two guiding members extending from each of the opposing sides of the leg receiving member.

4. The rocking mechanism according to claim 1, wherein the elastic member is a coil spring.

5. The rocking mechanism according to claim 1, wherein the elastic member is a urethane spring.

6. The rocking mechanism according to claim 1, wherein the leg receiving member has an upper side and a lower side, the upper side having an opening therein to receive a portion of the leg of the collapsible chair and the lower side having a depression therein to receive a portion of the elastic member.

7. The rocking mechanism according to claim 1, wherein the foot portion has an elastic member extension extending from the bottom into the internal cavity to center the elastic member in the foot portion.

8. The rocking mechanism according to claim 1, wherein the foot portion has a central axis, the central axis having a radius, the radius being less than infinity.

9. The rocking mechanism according to claim 1, wherein the foot portion has a central axis, the central axis having a radius, the radius being about 50 cm.

10. The rocking mechanism according to claim 1, wherein the leg receiving member is movable relative to the foot portion, the leg receiving member moving along a curved path within the foot portion.

11. The rocking mechanism according to claim 1, wherein the guiding member has a head portion and a threaded portion.

12. The rocking mechanism according to claim 11, wherein the head portion rotates relative to the threaded portion.

13. The rocking mechanism according to claim 11, wherein the head portion has a central opening and the threaded portion passes through the central opening.

14. A rocking mechanism for a leg of a chair comprising:
   a foot portion having a bottom and an open top, a wall extending between the bottom and the open top creating an internal cavity, the foot portion having a central axis, the central axis having a curvature thereto;
   a leg receiving member disposed within the internal cavity and having a second cavity to accept a portion of the leg of the collapsible chair, the leg receiving member having opposing sides;
   two elongated openings in the wall and extending therethrough, the two elongated openings being on opposite sides of the internal cavity and extending at least a portion of a distance between the bottom and the open top;
   at least one guiding member extending from each of the opposing sides of the leg receiving member and into a respective one of the two elongated openings in the side walls; and
   an elastic member disposed in the internal cavity between the leg receiving member and the bottom of the foot portion, wherein the guiding member has a head portion and a threaded portion, and the head portion rotates relative to the threaded portion.

15. The rocking mechanism according to claim 14, wherein the leg receiving member is movable relative to the foot portion, the leg receiving member moving along a curved path within the foot portion.

16. A rocking mechanism for a leg of a chair comprising:
   a foot portion having a bottom and an open top, a wall extending between the bottom and the open top creating an internal cavity, the foot portion having a central axis, the central axis having a curvature thereto;
   a leg receiving member disposed within the internal cavity and having a second cavity to accept a portion of the leg of the collapsible chair, the leg receiving member having opposing sides;
   two elongated openings in the wall and extending therethrough, the two elongated openings being on opposite sides of the internal cavity and extending at least a portion of a distance between the bottom and the open top;
   at least one guiding member extending from each of the opposing sides of the leg receiving member and into a respective one of the two elongated openings in the side walls; and
   an elastic member disposed in the internal cavity between the leg receiving member and the bottom of the foot portion, wherein the guiding member has a head portion and a threaded portion, and the head portion has a central opening and the threaded portion passes through the central opening.

* * * * *